(12) United States Patent
Ely et al.

(10) Patent No.: US 9,505,032 B2
(45) Date of Patent: Nov. 29, 2016

(54) DYNAMIC MASS RECONFIGURATION

(71) Applicant: Apple Inc., Cupertino, CA (US)

(72) Inventors: Colin M. Ely, Cupertino, CA (US); Avi Hecht, Beverly Hills, CA (US)

(73) Assignee: APPLE INC., Cupertino, CA (US)

( * ) Notice: Subject to any disclaimer, the term of this patent is extended or adjusted under 35 U.S.C. 154(b) by 643 days.

(21) Appl. No.: 13/831,182

(22) Filed: Mar. 14, 2013

(65) Prior Publication Data

US 2014/0260723 A1    Sep. 18, 2014

(51) Int. Cl.
*B06B 1/16* (2006.01)
*B06B 3/00* (2006.01)
*G06F 3/01* (2006.01)

(52) U.S. Cl.
CPC ............ *B06B 3/00* (2013.01); *B06B 1/164* (2013.01); *G06F 3/016* (2013.01); *Y10T 74/18552* (2015.01)

(58) Field of Classification Search
CPC ........ H02K 7/061; B06B 1/16; B06B 1/161; B06B 1/162; B06B 1/164; G06F 3/016
USPC ........................................... 74/61, 87
See application file for complete search history.

(56) References Cited

U.S. PATENT DOCUMENTS

| | | | | |
|---|---|---|---|---|
| 2,171,808 A | * | 9/1939 | Von Schlippe | G01M 5/0041 73/672 |
| 2,861,458 A | * | 11/1958 | Awedissjan | B06B 1/164 74/87 |
| 2,989,869 A | * | 6/1961 | Hanggi | B06B 1/164 404/113 |
| 3,606,296 A | | 9/1971 | Chassagne | |
| 3,772,923 A | * | 11/1973 | Burt | B06B 1/164 198/770 |
| 3,919,575 A | * | 11/1975 | Weber | B06B 1/164 310/81 |
| 4,278,726 A | | 7/1981 | Wieme | |
| 4,288,051 A | | 9/1981 | Göschel | |
| 4,314,735 A | | 2/1982 | Fullenkamp et al. | |
| 4,370,894 A | | 2/1983 | Sturesson et al. | |
| 4,580,456 A | * | 4/1986 | Takano | B06B 1/164 366/128 |
| 4,849,580 A | | 7/1989 | Reuter | |
| 4,940,336 A | * | 7/1990 | Dryga | B06B 1/163 310/81 |
| 5,182,158 A | | 1/1993 | Schaeffer | |
| 5,349,893 A | | 9/1994 | Dunn | |
| 5,368,914 A | | 11/1994 | Barrett | |
| 5,426,562 A | | 6/1995 | Morehouse et al. | |
| 5,507,665 A | | 4/1996 | Oda et al. | |
| 5,587,854 A | | 12/1996 | Sato et al. | |

(Continued)

FOREIGN PATENT DOCUMENTS

| | | |
|---|---|---|
| CN | 1458804 | 11/2003 |
| CN | 2710238 | 7/2005 |

(Continued)

OTHER PUBLICATIONS

International Search Report and Written Opinion, PCT/US2014/015699, 11 pages, May 13, 2014.

*Primary Examiner* — William C Joyce
(74) *Attorney, Agent, or Firm* — Brownstein Hyatt Farber Schreck, LLP

(57) ABSTRACT

Systems and methods involving reconfigurable rotating masses are disclosed. One embodiment may take the form of a system having a motor and coupled weights attached to the motor. Operation of the motor rotates the coupled weights and the weights are dynamically reconfigurable to change the location of the center of mass relative to an axis of rotation.

19 Claims, 30 Drawing Sheets

(56) References Cited

U.S. PATENT DOCUMENTS

| | | |
|---|---|---|
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,909,074 A | 6/1999 | Takaya et al. |
| 5,936,600 A | 8/1999 | Ohashi et al. |
| 5,965,249 A | 10/1999 | Sutton et al. |
| 5,982,617 A | 11/1999 | Haley et al. |
| 6,154,360 A | 11/2000 | Kaczeus et al. |
| 6,262,888 B1 | 7/2001 | Siedow et al. |
| 6,288,489 B1 | 9/2001 | Isohata et al. |
| 6,323,757 B1 | 11/2001 | Nagai |
| 6,324,054 B1 | 11/2001 | Chee et al. |
| 6,373,702 B2 | 4/2002 | Oishi et al. |
| 6,483,926 B1 | 11/2002 | Yamashita et al. |
| 6,524,692 B1 | 2/2003 | Rosen |
| 6,596,976 B2 | 7/2003 | Lin et al. |
| 6,603,620 B1 | 8/2003 | Berding |
| 6,627,818 B2 | 9/2003 | Kamel et al. |
| 6,633,481 B2 | 10/2003 | Pavol |
| 6,647,328 B2 | 11/2003 | Walker |
| 6,664,491 B2 | 12/2003 | Yanai et al. |
| 6,665,192 B2 | 12/2003 | Wimberger Friedl et al. |
| 6,744,186 B2 | 6/2004 | Oishi et al. |
| 6,809,916 B2 | 10/2004 | Nakata et al. |
| 6,859,357 B2 | 2/2005 | Morimoto et al. |
| 6,924,996 B2 | 8/2005 | Sugawara |
| 6,968,954 B2 | 11/2005 | Hsieh |
| 7,009,835 B2 | 3/2006 | Desai et al. |
| 7,059,182 B1 | 6/2006 | Ragner |
| 7,064,655 B2 | 6/2006 | Murray et al. |
| 7,094,094 B2 | 8/2006 | Zahnen et al. |
| 7,113,351 B2 | 9/2006 | Hovanky |
| 7,133,281 B2 | 11/2006 | Bae |
| 7,161,580 B2 | 1/2007 | Bailey et al. |
| 7,167,360 B2 | 1/2007 | Inoue et al. |
| 7,259,357 B2 | 8/2007 | Walker |
| 7,260,885 B2 | 8/2007 | Albrecht et al. |
| 7,354,315 B2 | 4/2008 | Goetz et al. |
| 7,369,345 B1 | 5/2008 | Li et al. |
| 7,373,863 B2 | 5/2008 | O'Banion et al. |
| 7,375,645 B2 | 5/2008 | Tsai |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,525,751 B2 | 4/2009 | Han et al. |
| 7,532,478 B2 | 5/2009 | Jeong |
| 7,549,335 B2 | 6/2009 | Inoue et al. |
| 7,554,798 B2 | 6/2009 | Tanokuchi et al. |
| 7,568,942 B1 | 8/2009 | Lannon et al. |
| 7,578,691 B2 | 8/2009 | Weksler et al. |
| 7,607,610 B1 | 10/2009 | Sterchak |
| 7,612,994 B2 | 11/2009 | Ulrich et al. |
| 7,619,891 B2 | 11/2009 | Woo et al. |
| 7,643,243 B2 | 1/2010 | Lee et al. |
| 7,652,892 B2 | 1/2010 | Shiu et al. |
| 7,660,107 B2 | 2/2010 | Leung |
| 7,684,183 B2 | 3/2010 | Mori et al. |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 7,919,945 B2 | 4/2011 | Houston et al. |
| 7,924,552 B2 | 4/2011 | Tseng |
| 8,044,818 B2 | 10/2011 | Tysowski et al. |
| 8,075,981 B2 | 12/2011 | Pearce et al. |
| 8,093,811 B2 | 1/2012 | Tanokuchi et al. |
| 8,106,789 B2 | 1/2012 | Yang et al. |
| 8,144,453 B2 | 3/2012 | Brown et al. |
| 8,189,280 B2 | 5/2012 | Ollila et al. |
| 8,190,015 B2 | 5/2012 | Li et al. |
| 8,240,777 B2 | 8/2012 | Prest |
| 8,248,777 B2 | 8/2012 | Prest |
| 8,275,420 B2 | 9/2012 | Lim |
| 8,289,689 B2 | 10/2012 | Chen et al. |
| 8,289,715 B2 | 10/2012 | Takahara |
| 8,305,744 B2 | 11/2012 | Shedletsky et al. |
| 8,330,305 B2 | 12/2012 | Hart et al. |
| 8,352,077 B2 | 1/2013 | Goswami et al. |
| 8,368,641 B2 | 2/2013 | Tremblay et al. |
| 8,411,432 B1 | 4/2013 | Zimlin et al. |
| 8,421,763 B2 | 4/2013 | Liao |
| 8,430,381 B2 | 4/2013 | Chen |
| 8,446,475 B2 | 5/2013 | Topliss et al. |
| 8,467,133 B2 | 6/2013 | Miller |
| 8,485,053 B2 | 7/2013 | Lee et al. |
| 8,503,121 B2 | 8/2013 | Osaka et al. |
| 8,564,424 B2 | 10/2013 | Evarts et al. |
| 8,694,251 B2 | 4/2014 | Janardhanan et al. |
| 8,798,534 B2 | 8/2014 | Rodriguez et al. |
| 8,862,182 B2 | 10/2014 | Shukla et al. |
| 8,872,448 B2 | 10/2014 | Boldyrev et al. |
| 8,896,995 B2 | 11/2014 | Shedletsky et al. |
| 8,903,519 B2 | 12/2014 | King et al. |
| 9,134,337 B2 | 9/2015 | Simoni et al. |
| 9,167,061 B2 | 10/2015 | Shuster |
| 9,300,776 B2 | 3/2016 | Petersen |
| 2005/0017396 A1 | 1/2005 | Pearce et al. |
| 2006/0109581 A1 | 5/2006 | Li et al. |
| 2007/0106483 A1 | 5/2007 | Kelley et al. |
| 2008/0024972 A1 | 1/2008 | Yamaguchi |
| 2008/0091309 A1 | 4/2008 | Walker |
| 2008/0163716 A1 | 7/2008 | Battlogg et al. |
| 2008/0192124 A1 | 8/2008 | Nagasaki |
| 2009/0219130 A1 | 9/2009 | Dai et al. |
| 2009/0273480 A1 | 11/2009 | Mittleman et al. |
| 2010/0149073 A1 | 6/2010 | Chaum et al. |
| 2010/0164152 A1 | 7/2010 | Li |
| 2010/0272969 A1 | 10/2010 | Taylor |
| 2011/0040410 A1 | 2/2011 | Kim et al. |
| 2011/0132114 A1 | 6/2011 | Siotis |
| 2011/0228460 A1 | 9/2011 | Kim et al. |
| 2011/0257765 A1 | 10/2011 | Evans et al. |
| 2012/0212484 A1 | 8/2012 | Haddick et al. |
| 2012/0212499 A1 | 8/2012 | Haddick et al. |
| 2012/0234981 A1 | 9/2012 | Nagabhushan et al. |
| 2013/0038278 A1 | 2/2013 | Park et al. |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0090881 A1 | 4/2013 | Janardhanan et al. |
| 2013/0100591 A1 | 4/2013 | Montevirgen et al. |
| 2013/0127980 A1 | 5/2013 | Haddick et al. |
| 2013/0218058 A1 | 8/2013 | Ceoldo et al. |
| 2013/0257582 A1 | 10/2013 | Rothkopf et al. |
| 2013/0278631 A1 | 10/2013 | Border et al. |
| 2013/0285490 A1 | 10/2013 | Rothkopf et al. |
| 2014/0253284 A1 | 9/2014 | Peterson et al. |
| 2014/0273607 A1 | 9/2014 | Orand et al. |
| 2015/0301565 A1 | 10/2015 | Manullang et al. |
| 2016/0154439 A1 | 6/2016 | Rothkopf et al. |

FOREIGN PATENT DOCUMENTS

| | | |
|---|---|---|
| CN | 2794023 | 7/2006 |
| CN | 201230310 | 4/2009 |
| CN | 102857589 | 1/2013 |
| EP | 1057504 | 12/2000 |
| GB | 715773 | * 9/1954 |
| GB | 1133198 | 11/1968 |
| JP | 2011099758 | 5/2011 |
| KR | 2004036970 | 5/2004 |
| TW | 501329 | 9/2002 |
| TW | I303192 | 11/2008 |
| WO | WO2010/135421 | 11/2010 |

* cited by examiner

DYNAMIC MASS RECONFIGURATION

TECHNICAL FIELD

The present application is related to rotating, coupled masses and, more particularly to changing a center of mass of a rotating mass to achieve a desired effect.

BACKGROUND

Haptic devices are generally designed to provide a tactile feedback to users of electronic devices. A commonly implemented haptic device is an eccentric weight that is rotated to cause vibration to occur. Generally, the stronger the vibrations, the more effective the haptic device. That is, a higher amplitude vibration will typically provide better feedback to a user than a low amplitude vibration. The amplitude may vary with several parameters; some of these are the frequency at which the weight rotates and the location of the center of mass relative to the axis of rotation, both of which are generally fixed parameters in conventional haptic devices.

SUMMARY

Embodiments described herein may take a number of forms for providing haptic feedback through dynamically re-centering masses with respect to an axis of rotation.

One embodiment may take the form of a system comprising: a motor; a shaft attached to the motor; a first weight fixed with respect to the shaft; a second weight adjacent the first weight and free to rotate at least partially about the shaft; and a third weight operationally connected to the first and second weights, the third weight configured to move outwardly from the shaft when a threshold of rotation is reached.

Further, in such an embodiment the center of mass of the three weights is other than the center of the shaft when the threshold of rotation is not reached; and the center of mass of the three weights is aligned with the center of the shaft when the threshold of rotation is reached.

Yet another embodiment may take the form of a method for providing a haptic feedback, comprising: driving a butterfly mass at a first frequency, the first frequency below a threshold; driving the butterfly mass at a second frequency, the second frequency above the threshold; wherein the haptic feedback is provided at the first frequency but not at the second frequency. In such an embodiment, when the threshold is reached, moving the third mass away from the first and second masses, thereby placing the butterfly mass in a balanced configuration with respect to rotation about a center of rotation.

Yet another embodiment may take the form of an electronic device having a processor, a communication system coupled to the processor, a controller coupled to the processor, a motor operatively coupled to the controller and a shaft coupled to the motor and configured to be rotated by the motor. A set of coupled weights is coupled to the shaft and includes a first weight and at least a second, adjacent weight. A center of mass of the set of coupled weights may be offset from an axis of rotation of the shaft at low rotational frequencies. The second weight may displaceable with respect the first weight to alter the position of the center of mass relative to the axis of rotation.

Still another embodiment may take the form of an apparatus for generating a haptic output, including: a first mass adjacent a shaft; a second mass adjacent the shaft; a third mass situated between the first and second masses; and a driver affixed to the shaft; wherein the driver is operative to rotate at least the first mass around the shaft in response to a rotation of the shaft.

While multiple embodiments are disclosed, still other embodiments of the present invention will become apparent to those skilled in the art from the following description. As will be realized, the embodiments are capable of modifications in various aspects, all without departing from the spirit and scope of the embodiments. Accordingly, the drawings and detailed description are to be regarded as illustrative in nature and not restrictive.

The drawings are provided to help readers better understand the concepts discussed herein. They are not however intended to be limiting in any way.

DETAILED DESCRIPTION

A system of coupled masses that can be driven at varying frequencies is provided. The masses may be coupled to a motor and have an axis of rotation such that some frequencies produce vibration while others produce reduced vibration amplitude and still others may produce no vibration at all. In one embodiment, two coupled masses may be provided with one configured to be driven at various frequencies. The other mass may be passively attached or otherwise moveably attached so that, in some embodiments, it may displace from a rest position due to centrifugal force as the first mass spins and a centripetal force (such as exerted by the first weight) may hold the second weight in the curved rotational path about the axis of rotation.

In one embodiment, the first weight is driven on an axis that does not go through the center of the mass for the coupled masses, thus generating vibration when driven at low frequencies or any frequency. In another embodiment, the first weight may be driven on an axis near or through the center of the mass. Hence, at low rotational speed, the weight produces little or no vibration. The second weight may be displaced, thereby shifting the center of mass from being at or near the center of the axis of rotation to generate vibration. In some embodiments, the shifting of the second weight is caused by centrifugal force. For example, the second weight may be located at or near an axis of rotation and is pulled away from the center as the weights spin. In other embodiments, the shifting of the second mass may be prompted by other forces. For example, a magnetic force may push or pull the second mass to a displaced position. Additionally, a restorative force may return the second weight to its original or resting position. This force may be provided by a spring, by the second weight itself or by a magnet.

The shifting of the center of mass of the coupled weights allows selective harmonic response of the vibration system to user input, alerts and so forth. That is, the weights may be configured to alter the center of mass at select frequencies to obtain a desired result. For example, the weights may reconfigure at a select frequency or over a range of frequencies that may alter an effect of the spinning weights. For example, the reconfigured weights may correspond to a high amplitude vibration output.

Figure 1:
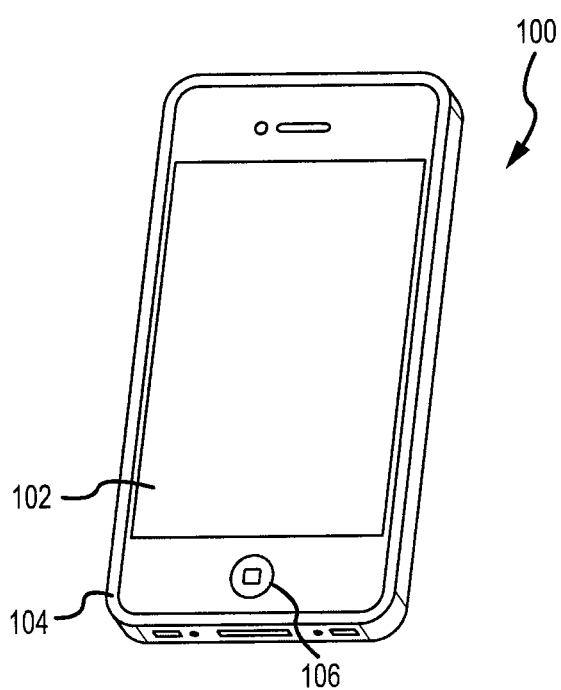
FIG. 1 is an isometric view of an example electronic device.

Turning to the drawings and referring to FIG. 1, an isometric view of an example mobile electronic device 100 is illustrated. The mobile electronic device 100 may include one or more haptic devices that may serve as alerts to a user and/or function to alter angular momentum of the device to help reduce damage or likelihood of damage to the device 100 (or select components of the device 100) upon impact from a free-fall. It should be appreciated that the mobile electronic device 100 may take any suitable form, including but not limited to a digital music player (e.g., MP3 player), a digital camera, a smart phone (e.g., iPhone® by Apple, Inc.), a laptop computer, or tablet computer.

The mobile electronic device 100 may include a display screen 102, an enclosure 104, and an input member 106. Generally, the display screen 102 provides a visual output for the mobile computing device 100 and may take the form of a liquid crystal display screen, plasma screen, organic light emitting diode display, and so on. Additionally, in some embodiments the display screen 102 may provide both input and output functionality. For example, the display screen 102 may include a capacitive input sensor so to receive input form a user upon the user touching the display screen with his or her finger. The enclosure 104 defines a structure that may at least partially enclose the various components of the mobile computing device 100. The input member 106 permits a user to provide input to the mobile computing device 100. The input member 106 may include one or more buttons, switches, or the like that may be pressed, flipped, or otherwise activated in order to provide an input to the mobile computing device 106. For example, the input member 106 may be a button to alter the volume, return to a home screen, or the like. Additionally, the input member 106 may be any suitable size or shape, and may be located in any area of the mobile computing device 100. Furthermore, the input member 106 may be combined with the display screen 102 as a capacitive touch screen.

Figure 2:
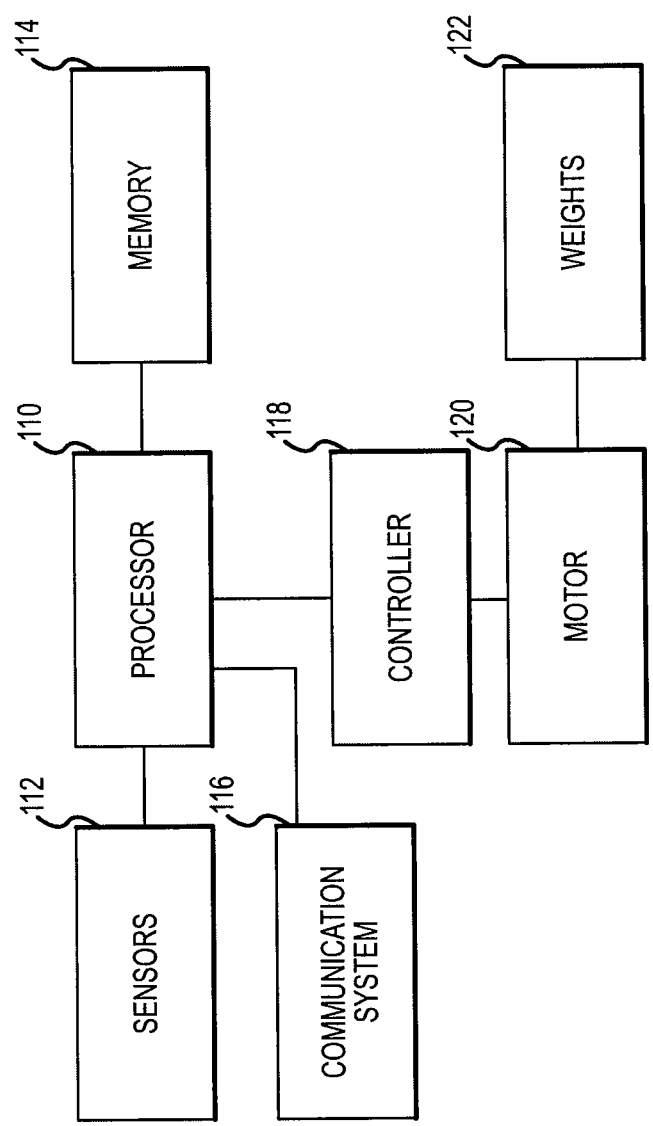
FIG. 2 is a block diagram of an example electronic device.

FIG. 2 is a block diagram of an embodiment of the mobile computing device 100 illustrating select electrical components. The mobile computing device 100 may include a processor 110, sensors 112, memory 114, and a network/communication system interface 116. The mobile computing device 100 may also include a controller 118, a motor 120 and weights 122. The controller 118 may be coupled to the processor 110 and configured to operate the motor 120. The motor 120 may drive the weights 122 in order to generate a vibration alert, tactile feedback to a user, and/or to alter the angular momentum of the device 100 in the event of a free-fall. As such, the mobile device 100 may be configured to operate the motor 120 to provide an appropriate response to user input (e.g., via the sensors), to incoming data (e.g., an incoming text, call, email, and so forth via the network communication system interface 112), to a free-fall event (e.g., as sensed by one or more of an accelerometer, gyroscope, and so forth), or other events. The configuration of the device 100 may be performed at least in part by programming the device upon manufacture. Additionally, certain configurations may be performed by an end user. For example, and end user may be able to selectively configure alerts indicated by operation of the motor 120. It should be appreciated that the device 100 may include more or fewer components and FIG. 2 is intended to be exemplary only.

Figure 3A:
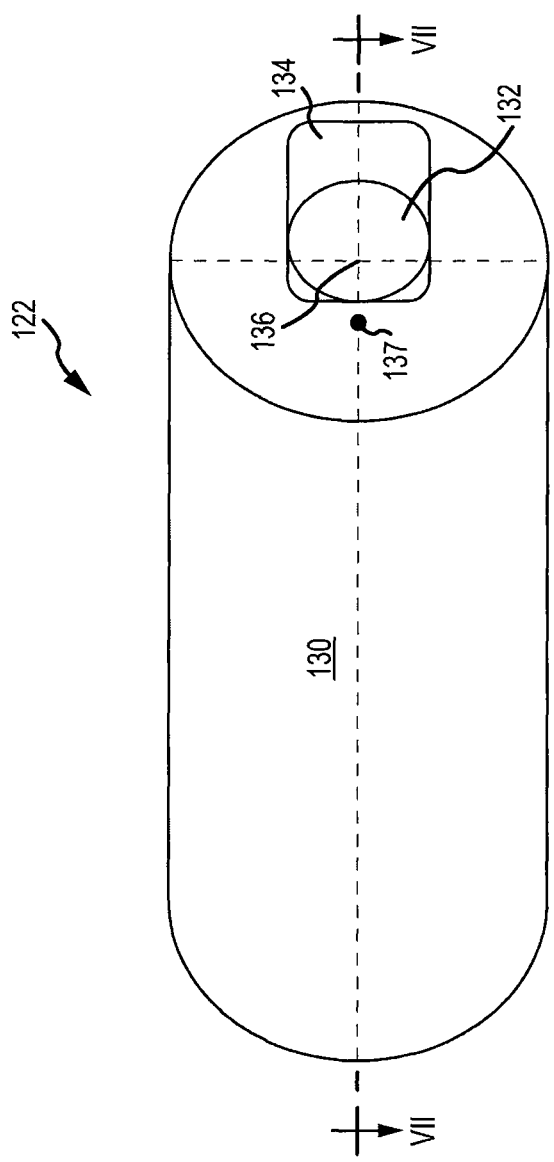
FIG. 3A illustrates an example of coupled weights forming a dynamic mass.

FIG. 3A illustrates an example of the weights 122. The weights may 122 take the form of a coupled mass. Specifically, the weights 122 may include two or more distinct weight members that are coupled together or placed together so as to form a mass having a center of mass. As illustrated, for example, the weights 122 may include a first weight 130 and a second weight 132. The first weight 130 may generally be larger than the second weight 132 and may have more mass than the second weight. Additionally, the first weight 130 may house the second weight 132. That is, the second weight 132 may be located within the first weight 130. In FIG. 3A, for example, the second mass 132 may reside within a slot 134 of the first mass 130. It should be appreciated that the weights 122 may be coupled together in a variety of different manners to achieve the desired purposes. That is, the second weight 132 and the first weight 130 may be coupled together in any suitable manner that allows for one or both of the weights to displace from a rest position relative to the other weight to change a center of mass for the weights 122.

The second weight 132 may be secured within the slot 134 of the first weight 130 in any suitable manner. For example, the second weight 132 may be coupled at its base within the slot 134 to allow displacement of the second weight through deflection or displacement of the second weight. In other embodiments, the slot 134 may be provided with retaining features (not shown) such as one or more tabs located about the edge of the slot and extending into the slot, to prevent the second weight from exiting the slot. In still other embodiments, the second weight may be formed from the first weight by removing material of the first weight to form the slot 134 and leaving the second weight In some embodiments, the first and second weights 130, 132 may be made of the same material. For example, in some embodiments, tungsten may be used for each weight. Further, one or more of the weights may be magnetic. In other embodiments, the first and second weights 130, 132 may be made from different materials. For example, the first weight 130 may be made from tungsten and the second weight 132 may be made from a magnetic material. Generally, the materials selected for use as the weights 122 will be dense materials so that they have a high weight to volume ratio. This allows for smaller sized weights while still providing a desired output vibration or effect upon angular momentum. Additionally, the weights 122 may take any suitable shape. As shown, the first and second weights 130, 132 are cylinders. However, other shapes may be implemented. Moreover, the first weight 130 and the second weight may take different shapes.

A geometric center 136 of an end of the first weight 130 is illustrated at the intersection of the dashed cross-hairs. Additionally, a center of mass 137 is shown as being slightly offset to the left of the geometric center 136. Due to the slot in the first weight 130 and the positioning of the second weight 132, the geometric center may not correspond with a center of mass of the weights 122. In some embodiments, the geometric center 136 may correspond to an axis of rotation. In other embodiments, the axis of rotation may correspond to a center of combined mass of the weights 122. Further, in some embodiments, one or more of the center of mass, axis of rotation, and geometric center may coincide.

Figure 3B:
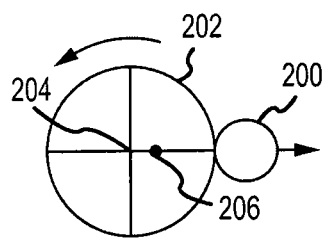
FIG. 3B illustrates a second example of coupled weights forming a dynamic mass.

FIGS. 3B-3F illustrate several different alternative example embodiments of coupled weights. In each, first and second weights may displace relative to each other as the weights are spun. In each of FIGS. 3B-C, an axis of rotation is perpendicular to the drawing (e.g., extends out from the sheet), whereas in FIG. 3D the axis of rotation is shown as being parallel to the drawing (e.g., runs left to right). In FIG. 3B, second weight 200 is external to the first weight 202. A geometric center 204 of the first weight 202 is shown as well as a center of mass 206 for the coupled weights. As the weights spin, the second weight 200 separates from the first weight 202 as shown by the arrows.

Figure 3C:
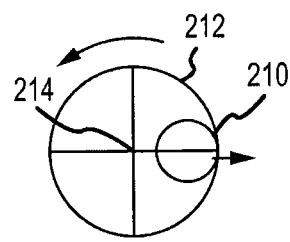
FIG. 3C illustrates a third example of coupled weights forming a dynamic mass.
Figure 3D:
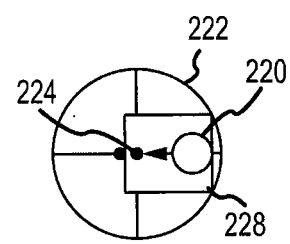
FIG. 3D illustrates a fourth example of coupled weights forming a dynamic mass.
Figure 3E:
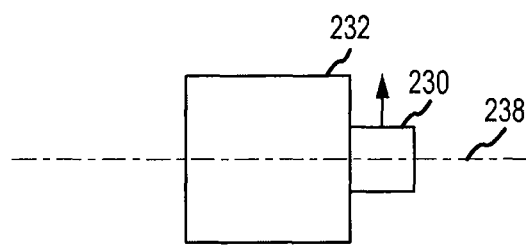
FIG. 3E illustrates a fifth example of coupled weights forming a dynamic mass.
Figure 3F:
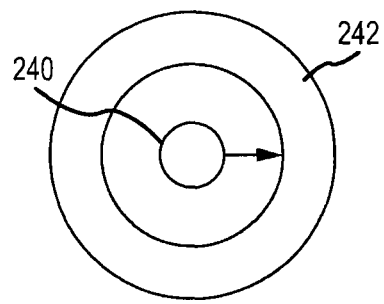
FIG. 3F illustrates a sixth example of coupled weights forming a dynamic mass.

In FIG. 3C, the second weight 210 may be located within the first weight 212 while at rest and may exit or separate from the first weight when spun. In this embodiment, the center of mass and axis of rotation may each be near the geometric center 214 of the first weight 212. In FIG. 3D, the second weight 220 may be disposed within a slot 228 of the first weight 222 but may displace towards a geometric center 224 of the first weight 222 when the weights are spun. In this example, the axis of rotation may be at or near a center of the second weight when at rest. In some embodiments, the second weight's position may be actively controlled using magnets, for example. In FIG. 3E, the second weight 230 may again be external to the first weight 232 and axis of rotation 238 may pass through one or both of the weights. As the weights are spun, the second weight 230 may displace along a surface of the first weight 230 to change the center of mass relative to the axis of rotation 238. In still other embodiments, the first weight 242 may take an annular shape into which the second weight 240 is disposed, as shown in FIG. 3F.

Figure 4:
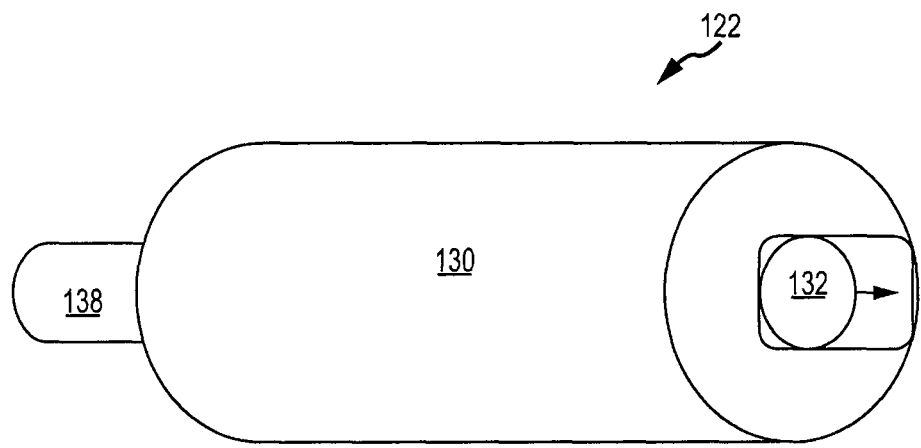
FIG. 4 illustrates the coupled weights of FIG. 3 coupled to a shaft with a second weight in a resting position.
Figure 5:
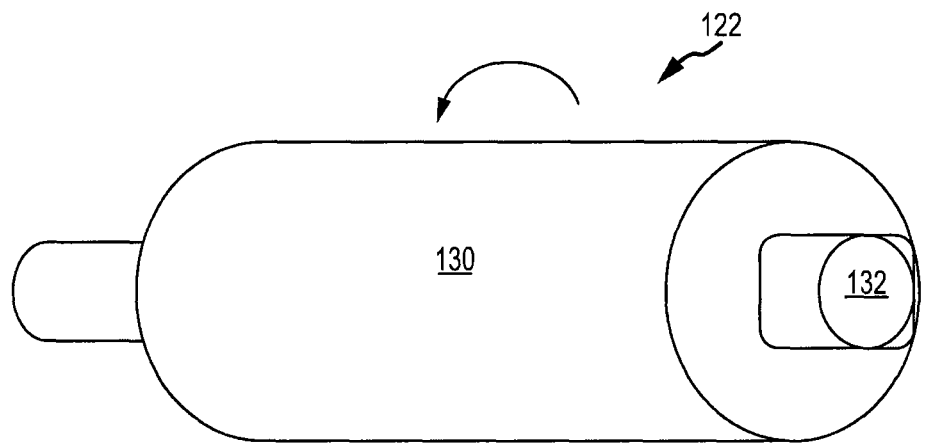
FIG. 5 illustrates the coupled weights of FIG. 3 rotating and the second weight being displaced from the resting position to alter a center of mass of the coupled weights.

FIG. 4 illustrates the weights 122 with the first weight 130 attached to a shaft 138. In particular, the shaft 138 may be coupled the geographic center of the first weight 130. The shaft 138 may also be coupled to the motor 120 and the motor may drive the shaft so that rotates about its longitudinal axis. As mentioned previously, the second weight 132 may be passively coupled to the first weight so that it may move relative to the first weight. In some embodiments, the second weight 132 is at rest at or near an inner position within the slot 134. That is, a center of the second weight 132 may rest at or near the geometric center of the first weight. As shown in FIG. 5, as the shaft 138 and the first weight 130 rotate, centrifugal force may push the second weight 132 to an outer position within the slot 134.

The displacement of the second weight 132 causes a shift in the center of the mass of the coupled weights. As such, the center of mass is moved further away from the axis of rotation, thereby providing an output with an increased amplitude. Specifically, as the center of mass shifts due to the shifting of the second weight away from the axis of rotation, the angular velocity of the second weight and therefore the angular momentum of the second weight increases to increase the amplitude of vibration. The increased amplitude may better alert and obtain the attention of the user. Additionally, in embodiments, where the weights are utilized to alter the angular momentum of the falling device, the altered center of mass and increased amplitude output may help to better alter the angular momentum.

Figure 6:
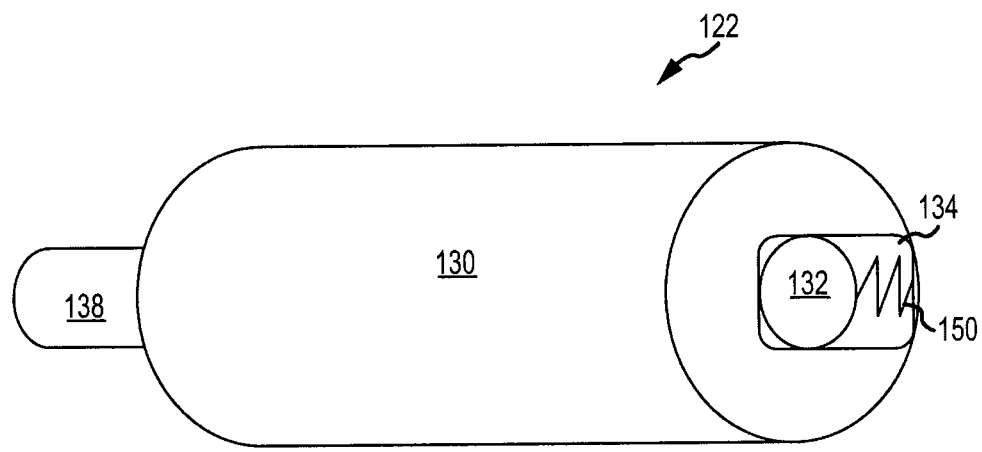
FIG. 6 illustrates the coupled weights of FIG. 3 having a spring provide a restoring force to restore the second weight back to the resting position.

FIG. 6 illustrates an embodiment that includes a spring 150 located within the slot 134 to hold the second weight 132 in the resting position. In particular, the spring 150 may be attached within the slot at or near an outer wall 152 of the slot. Although a single spring 150 is illustrated, multiple springs may be utilized some embodiments. Additionally, it should be appreciated that in other embodiments one or more springs may be located within the slot 134 at or near the inner wall in addition to or instead of the spring 150. Generally, the springs may be configured to hold the second weight 132 in place until the centrifugal force exceeds, and thereby overcomes, the restraining force of the spring and the second weight is displaced. More particularly, the spring 150 may be configured to exert a force on the second weight hold it in its resting position until the centrifugal force exceeds the restoring force of the spring and the second weight displaces. It should be appreciated that as the spring is compressed, the force required to compress the spring increases, as such, the second weight may displace over a range of frequencies until the spring reaches a maximum compressed state that may correspond to a rotational frequency that produces a desired vibration. For example, the spring may be configured to hold the second weight in its rest position until a frequency is reached at which the weights 122 produce the desired vibrational amplitude in the device 100.

Figure 7:
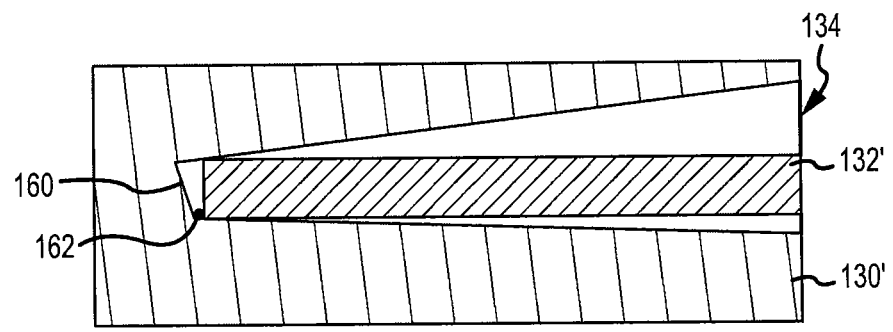
FIG. 7 is a cross-sectional view taken along line VII-VII of the coupled weights of FIG. 3 illustrating the second weight being attached at its base to the first weight in accordance with an alternative embodiment.

FIG. 7 is a cross-sectional view taken along line VII-VII in FIG. 3 showing another embodiment. In particular, in FIG. 7, the second weight 132' is shown as a deflecting beam. The second weight 132' may be attached at its base 160 to an interior surface 162 of the slot 134 of the first weight 130. The second weight may be hinged, or otherwise moveably attached the interior surface 162. For example, a spring hinge may be implemented to provide a restoring force. In some embodiments, ball and socket joint may moveably attach the first and second weights. Alternatively, the second weight may be slideably attached to the interior surface 162. In other embodiments, the second weight may be formed from the same block of material as the first weight. For example, the second weight may be formed as material is removed from the first weight to create the slot 134. In embodiments where the first and second weights 130', 132' are made of the same material, this may be a more efficient way to manufacture the weights 122. However, where the first and second weights are made of different materials, the second weight is attached within the slot 134.

As the weights are spun by the motor 120, the second weight 132' deflects within the slot 134 to move from its resting position to the outer position. Therefore, the slot 134 may be tapered in some embodiments and still accommodate displacement of the second weight. In other embodiments, the slot may have squared edges rather than tapered edges. As with the previous embodiment, the second weight 132' may displace when the centrifugal force exceeds a restoring force that may correlates to a frequency that generates a desired result. In some embodiments, the second weight 132' may act as a spring as it deflects and, as such, may be configured to deflect after a certain frequency of rotation is reached which generates centrifugal force that overcomes the force of the second weight 132'.

Figure 8A:
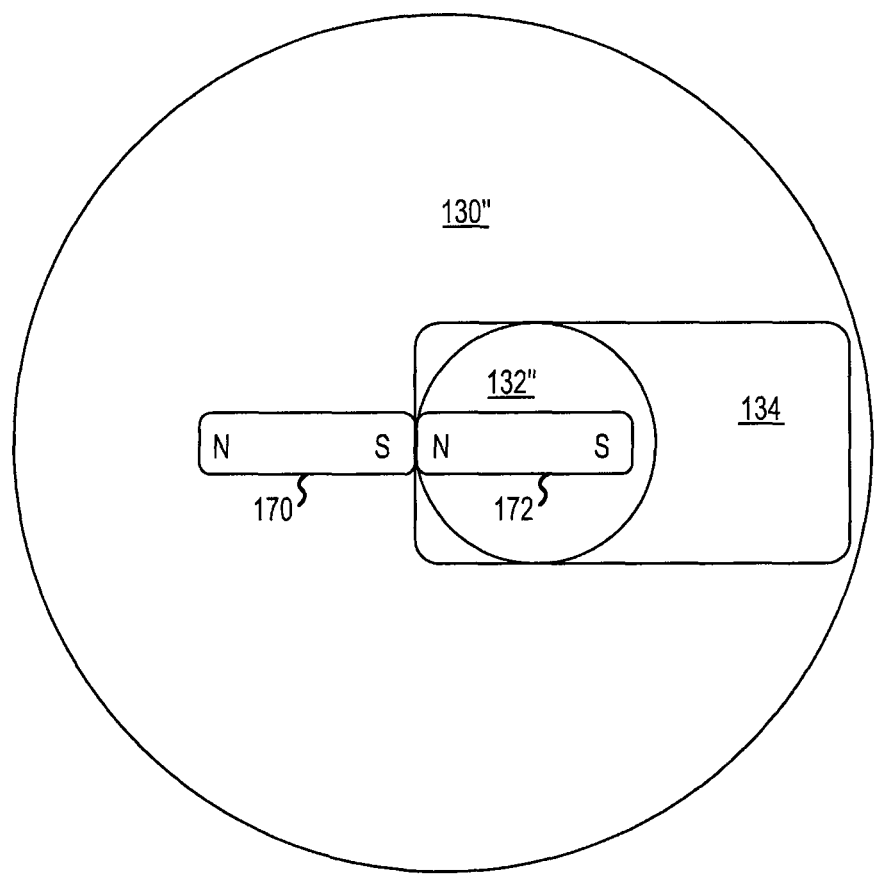
FIG. 8A illustrates the coupled weights of FIG. 3 including magnets to hold the second weight in a resting position.

Referring to FIG. 8A, another embodiment is illustrated in which magnetic force is used to hold the second weight 132 in place or displace it. In FIG. 8A, for example, the first weight 130" may include a magnet 170 having north and south poles. The second weight 132" may include a magnet 172 as well having north and south poles, but with the poles oriented oppositely from that of the magnet 170 of the first weight. As such, the south pole of magnet 170 may be oriented toward the north pole 172 so that the second weight is held in a resting position. Again, as the weights 122 spin centrifugal force will pull the second weight to a displaced position. However, the centrifugal force generally must exceed the magnetic force holding the second weight in the rest position before the second weight will move.

The magnets 170, 172 may be embedded in the first and second weights 130", 132" or may be adhered or otherwise attached to a surface of the respective weights. Several alternative embodiments may be implemented as well. For example, in one embodiment, one or both of the first and second weights 130", 132" may be magnets. Alternatively, one of the weights may be a magnet and the other a magnetic material. In yet another embodiment, one or more weights may be an electromagnet that may be selectively magnetized to hold the second weight in a desired position. The controller may be used in some embodiments to control the magnetism of the weights. In some embodiments, the poles of the electromagnet may be reversed to repel the second weight to a displaced position. Additionally, the first weight may include magnets near the displaced position of the second weight to either hold or repel the second weight.

Figure 8B:
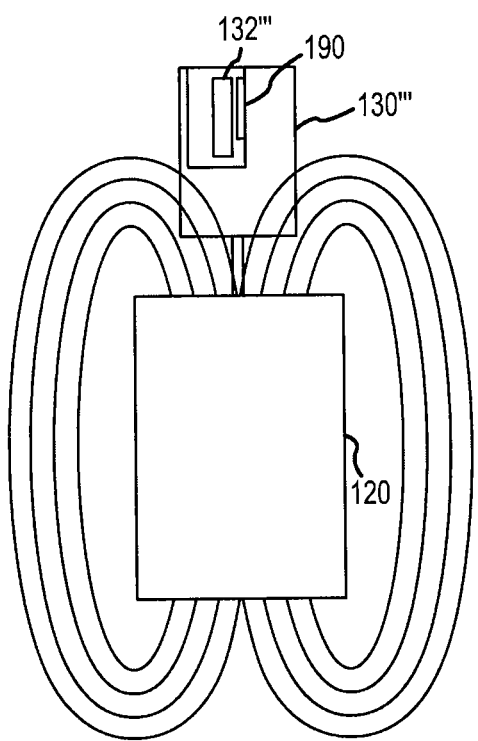
FIG. 8B a motor generating magnetic flux lines which may influence the positioning of a second weight located within a first weight.

Further, in some embodiments, the motor 120 may be used to provide the magnetism for the weights 122. FIG. 8B illustrates the motor 120 generating magnetic flux lines which may influence the positioning of the second weight 132''' located within the first weight 130'''. Magnetic flux lines 189 are illustrated to show how a magnetic field from operation of the motor 120 may reach the first and second weights. Further, a magnetic member 190 may be provided within the first member and which may be influenced by the magnetic field of the motor to either displace or hold the second weight 132''' in a desired location. The weight spins in synchronization with the motor, and the motor's magnetic coils are driven in a pattern similar to a sinusoid. Therefore in the weight's rotating reference frame, the magnetic field from the motor is always in approximately the same direction, assuming the weight is attached directly without a gearbox. When the motor is off or driven at low power, the movable weight 132 will not shift, while the magnetic field will shift the weight when the motor is driven at a higher power.

Figure 9:
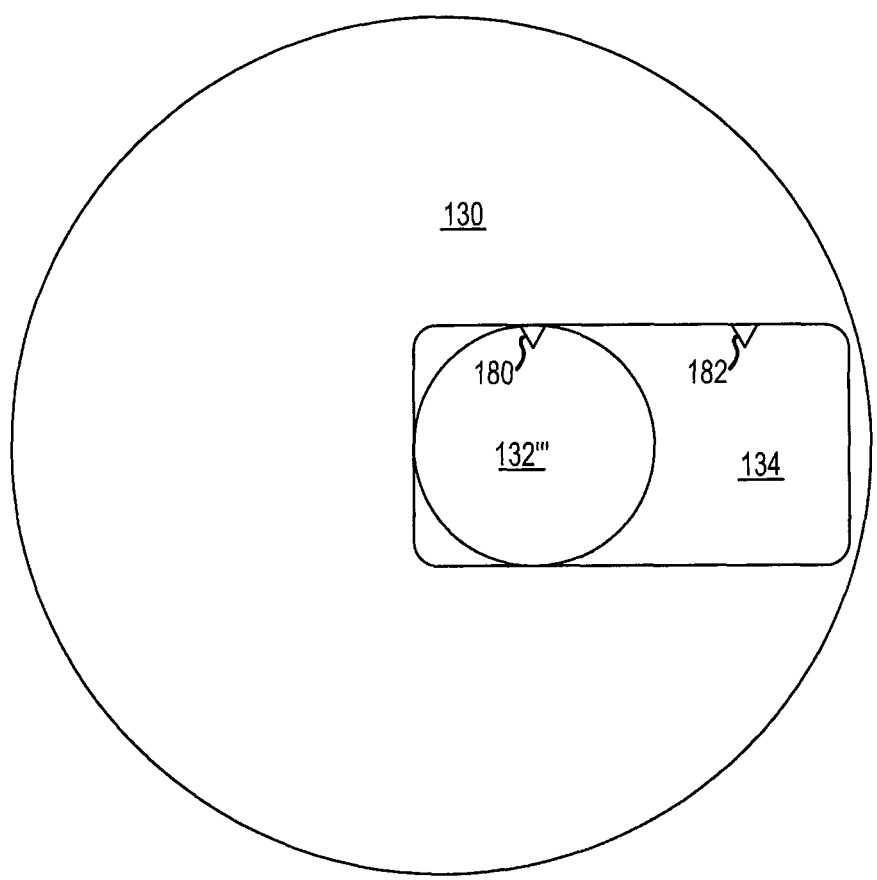
FIG. 9 illustrates the coupled weights of FIG. 3 including detents to hold the second weight in a displaced position.

FIG. 9 illustrates yet another alternative embodiment in which detents are used to hold the second weight in a desired position. In particular, the slot 134 may include one or more detents 182 that correspond to apertures 180 in the second weight 132'''. In one embodiment, a detent may help secure the second weight in a rest position. In another embodiment, a detent may help secure the second weight in a displaced position. The detents may be made of any suitable material and in one embodiment may be made of the same material as one of the first or second weights. Additionally, the detents may take any suitable shape, such as triangular, square and so forth.

The use of a detent in the resting position helps to hold the second weight in the rest position when the weights are spun at a relatively low frequency and up until some threshold frequency is reached. Upon reaching the threshold frequency, centrifugal force may displace the second weight. Similarly, the detent in the displaced position may be used to hold the second weight in the displaced position at lower frequencies. In particular, the motor may initially operate at a high frequency to displace the second weight, the motor may then reduce its frequency and the second weight may maintain its displaced position. This may be useful to help conserve power, as the motor may operate at lower speeds and still achieve a high amplitude output due to the displaced second weight. A spring or other device (not shown) may provide a restorative force to help return the second weight to its resting position once the motor stops.

Figure 10:
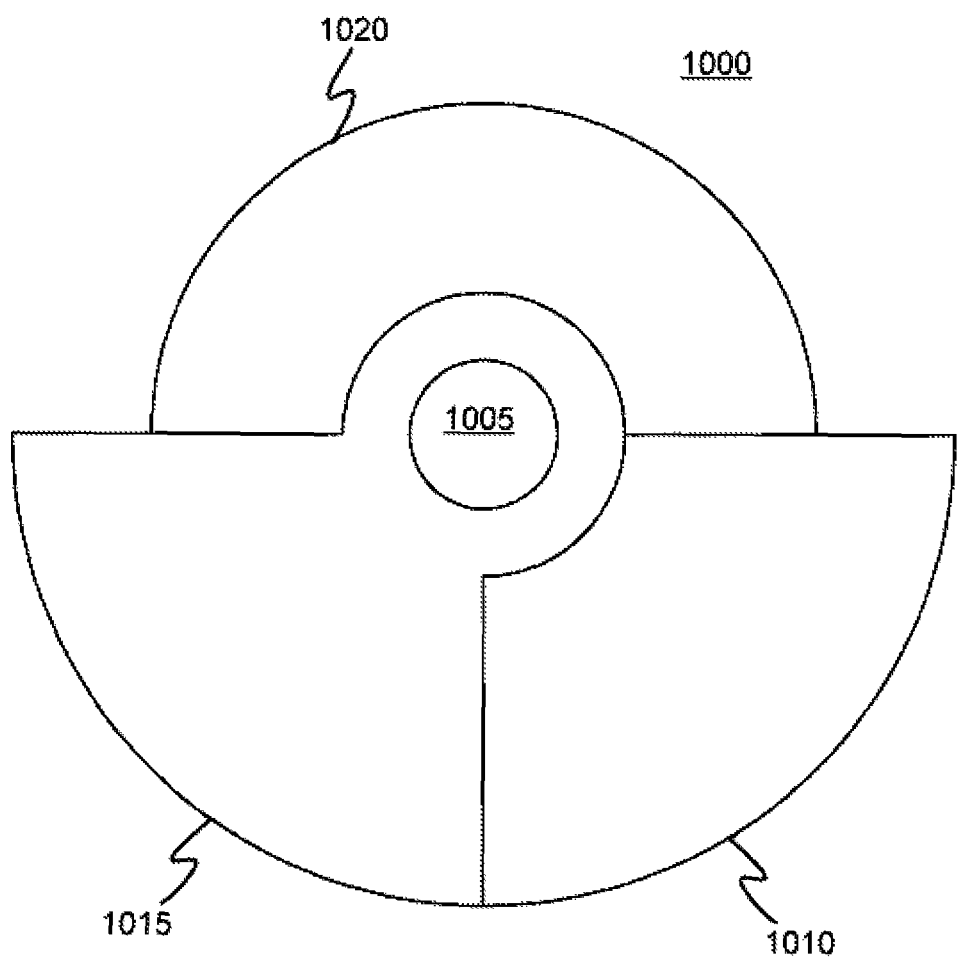
FIG. 10 depicts a sample butterfly weight in an unbalanced position, for example during low-frequency rotation.

In addition to the foregoing, certain embodiments may employ a weight that is unbalanced at low rotation speeds but balanced at high rotation speeds. For example and as shown in FIG. 10, one embodiment may use a butterfly-style weight 1000 that is linked to a shaft 1005 defining an axis of rotation extending longitudinally along the shaft (e.g., in and out of the view of FIG. 10).

The butterfly weight 1000 may be formed from multiple linked masses, such as a fixed mass 1010, a rotating mass 1015 and a floating mass 1020. Generally, the fixed mass may be permanently fixed to the axis of rotation or an element moving about the axis of rotation (such as the shaft 1005). The rotating mass 1015 may be configured to rotate at least partially around the axis of rotation. In some embodiments, the rotating mass 1015 may rotate freely about the axis of rotation, while in other embodiments it may be constrained from separating past a certain point from either the fixed mass or floating mass.

The floating mass 1020 may be connected to one or both of the fixed mass 1010 and rotating mass 1020. Generally, the floating mass is not directly coupled to the shaft 1005, but may be indirectly coupled thereto (such as through the fixed mass 1010). It should be appreciated that any of the fixed mass 1010, rotating mass 1015 and floating mass 1020 may be formed from one or more elements that cooperate with one another during operation of the embodiment, even though each is shown as a unitary element. That is, any of the masses described herein may be formed from multiple sub-masses, as necessary or desired. Accordingly, the discussion of this and following embodiments is intended to embrace any embodiment having multiple fixed masses, multiple rotating masses, and/or multiple floating masses.

Operation of the butterfly weight 1000 will now be described. During low frequency rotation (e.g., rotation of the shaft 1005 at low speed), the three masses 1010, 1015, 1020 may generally be adjacent to one another as shown in FIG. 10. A connection mechanism, as described in more detail below, maintains the fixed mass 1010 and rotating mass 1015 in an adjacent position with respect to one another. Essentially, the connection mechanism permits the fixed mass 1010 to drag the rotating mass 1015 as the shaft 1005 rotates below a threshold frequency.

In this configuration (e.g., the configuration shown in FIG. 10), the butterfly weight 1000 is unbalanced and may provide a first haptic feedback. This first haptic feedback may be a fairly strong vibration or force exerted on a housing of an electronic device incorporating the butterfly weight 1000. The unbalanced, off-center mass of the butterfly weight 1000, when in this configuration, exerts a time-variant force against the shaft 1005 and, ultimately, against anything to which the shaft is connected, such as a motor and/or housing of the electronic device. This vibrates the shaft and connected elements. This vibration may be used as a haptic output or signal.

During high-frequency/high speed rotation, the butterfly weight 1000 may shift into a balanced configuration, such that the center of mass of the weight 1000 generally is at the axis of rotation. In some embodiments, the center of mass of the butterfly weight may not be exactly at the axis of rotation but positioned near it.

Figure 11:
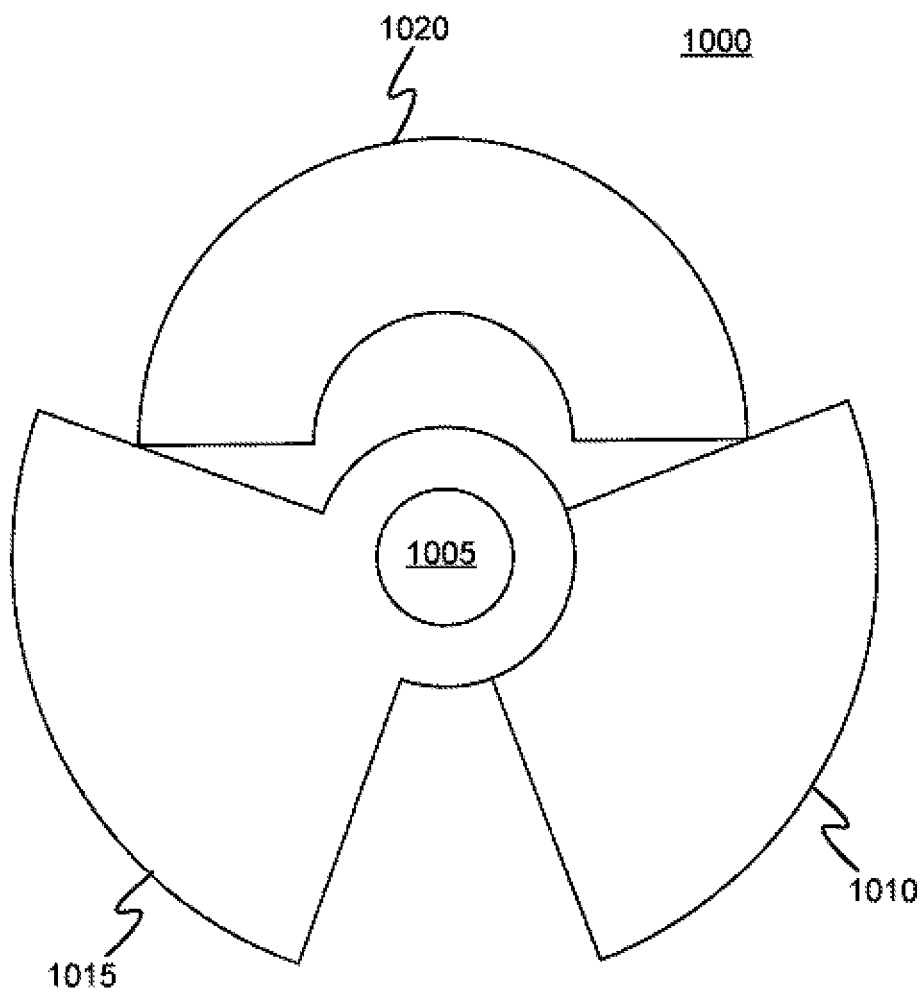
FIG. 11 depicts the sample butterfly weight of FIG. 10 in a balanced configuration, for example during high-frequency rotation.

FIG. 11 depicts the sample butterfly mass 1000 in a balanced configuration. When the rotational speed of the mass passes a threshold, the retaining force of the connection mechanism may be overcome by the centripetal force of rotation exerted on the floating mass 1020. The floating mass 1020 therefore moves outward, away from the axis of rotation and the shaft 1005. Since the floating mass is coupled to the rotating and fixed masses, this outward motion pulls the rotating and fixed masses away from each other. Thus, at speeds above the threshold speed, the fixed mass 1010 and rotating mass 1015 may separate from one another, as generally shown in FIG. 11.

Generally, the fixed mass 1010, rotating mass 1015 and floating mass 1020 may be configured such that the overall center of mass of the three (e.g., the center of mass of the butterfly mass 1000) is on the axis of rotation when the masses are separated, as shown in FIG. 11. As one example, the floating mass 1020 may be made of a denser material, or may be larger, than the fixed and/or rotating masses. As another example, the fixed and/or rotating masses may have thicker portions at the edges or sides nearest the floating mass than at the portions distant from the floating mass. It should be appreciated that the masses of each constituent element may be varied in a number of ways in order to place the center of mass of the butterfly weight 100 at the axis of rotation when the butterfly weight is in the configuration shown in FIG. 11.

Still with respect to FIG. 11, it should be appreciated that the mass-balanced configuration of the butterfly weight 1000 generally reduces vibrations when compared to the configuration of the butterfly weight shown in FIG. 10. Accordingly, the haptic output (if any) generated by the butterfly weight when in the balanced configuration shown in FIG. 11 may be different from the output generated when in the unbalanced configuration of FIG. 10.

Figure 12:
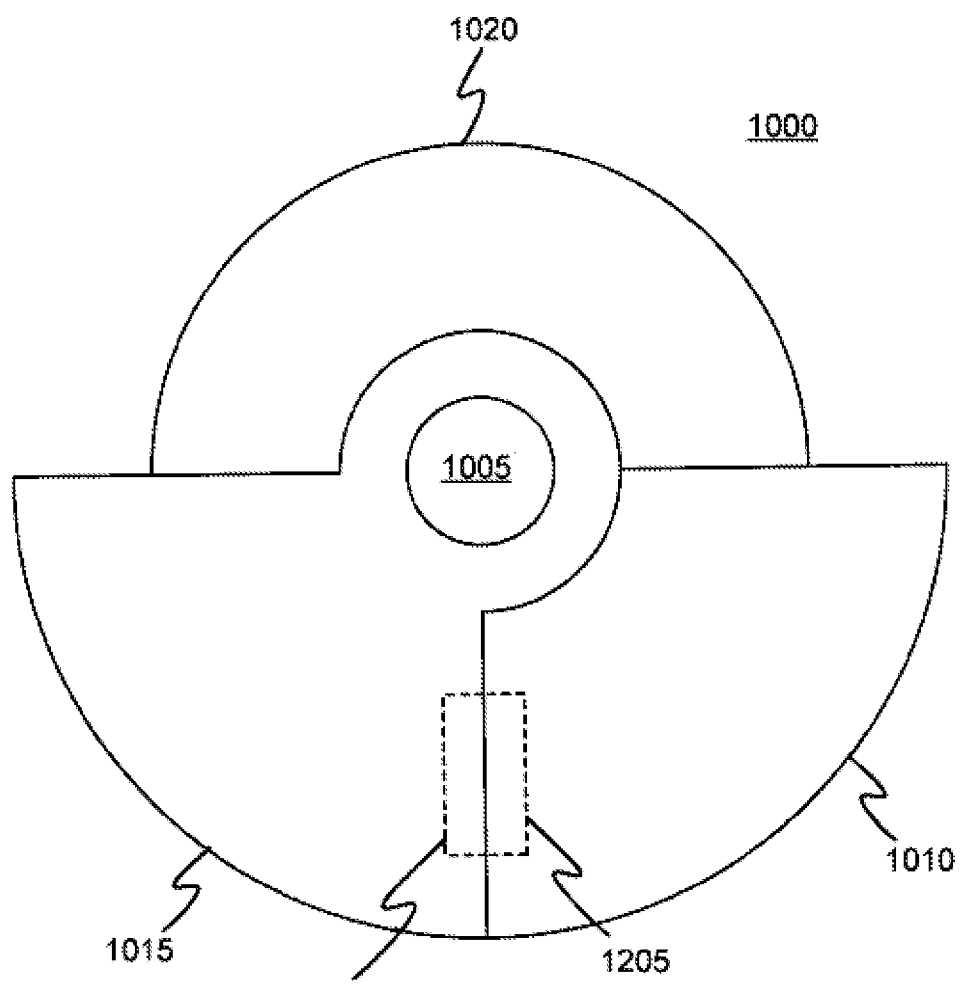
FIG. 12 shows the butterfly weight of FIG. 10 incorporating a set of magnets as a connection mechanism.
Figure 13:
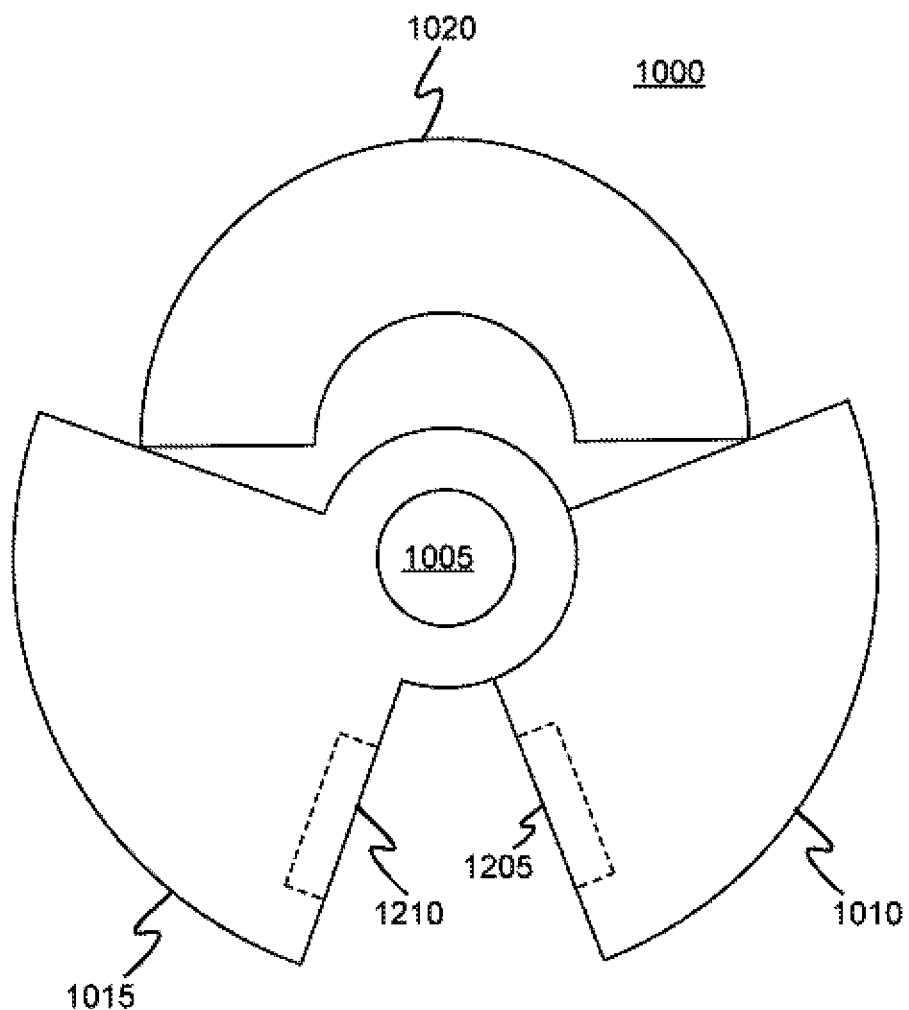
FIG. 13 shows the butterfly weight of FIG. 12 in a balanced configuration, with the connection mechanism separated.

As previously mentioned, a connection mechanism 1200 may be used to keep the fixed mass 1010 and rotating mass 1015 adjacent to one another during low frequency rotation. One example of such a connection mechanism is shown in FIGS. 12-13. Each of the fixed mass 1010 and rotating mass 1015 include a magnet 1205, 1210, oriented such that the magnets attract one another. The attractive force between the magnets 1205, 1210 generally keep the fixed mass 1010 and rotating mass 1015 connected to one another during low frequency rotation.

When the butterfly weight 1000 rotates above a certain frequency (e.g., high-speed rotation), the centripetal force exerted on the floating mass 1020 may be sufficient to cause the floating mass to pull the fixed and rotating masses 1010, 1015 apart. That is, the centripetal force is translated through the floating mass 1020 to the fixed and rotating masses, and may be sufficient to overcome the attraction of the magnets 1205, 1210 to one another. When rotation of the butterfly weight 1000 about the axis of rotation drops below a certain frequency, the magnets may attract one another and restore the butterfly weight to the configuration shown in FIG. 12. It should be appreciated that the threshold speed at which the fixed and rotating masses may be different from the speed at which the fixed and rotating masses return to their adjacent positions. Further, rather than relying on magnetic attraction to return the fixed and rotating masses to their initial positions, these masses may be biased to be adjacent to one another during low-frequency rotation of the butterfly weight.

Figure 14:
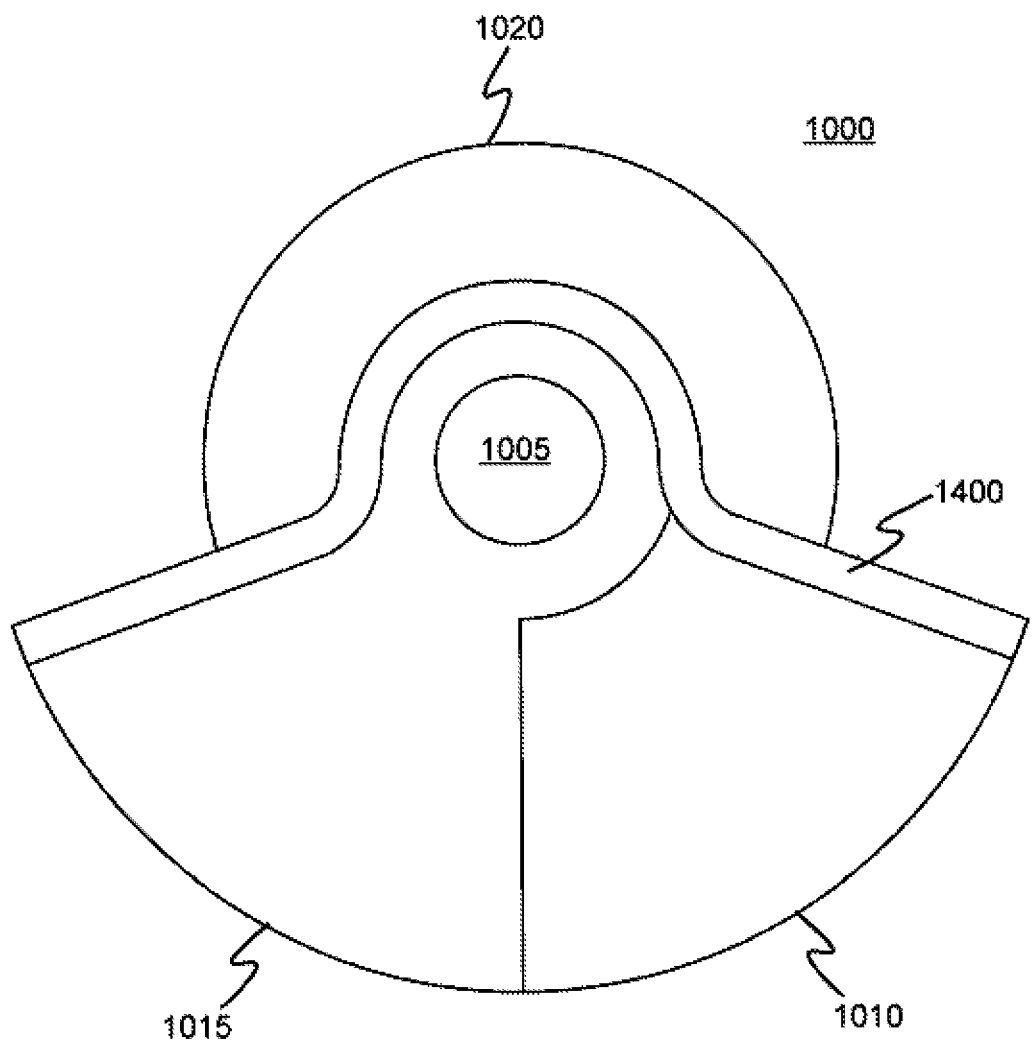
FIG. 14 shows a sample butterfly weight with an alternative connection mechanism, namely a spring.
Figure 15:
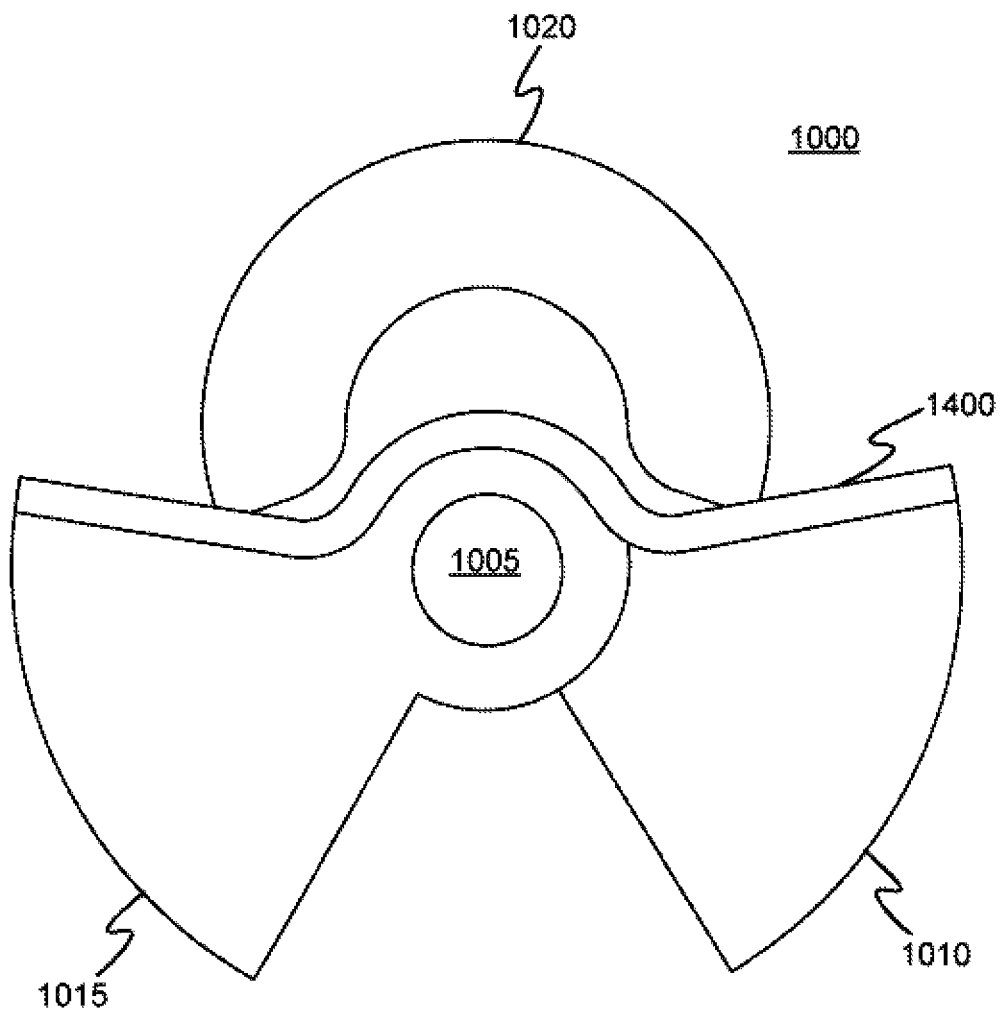
FIG. 15 shows the sample butterfly weight of FIG. 14 in a balanced configuration.

Certain embodiments may employ a connection mechanism 1200 other than the magnets illustrated in FIGS. 12 and 13. For example, FIGS. 14 and 15 illustrate a spring used as a connection mechanism with respect to the butterfly weight 1000. The arms of the c-spring 1400 generally exert a radial force on the fixed and rotating masses 1010, 1015. This radial force may bias the fixed and rotating masses toward one another, keeping them in a generally adjacent configuration as shown in FIG. 14.

When the centripetal force exerted on the floating mass is sufficiently large (due to high frequency rotation of the butterfly weight), the floating mass will move outward, dragging the rotating and fixed masses into the configuration shown in FIG. 15. The centripetal force on the floating mass must be such that the resulting expansionary force exerted on the fixed and rotating masses by the floating mass exceeds the spring force exerted by the C-spring. Conversely, when rotation slows, the restoring force of the C-spring will exceed the expansionary force and the butterfly weight 1000 will return to the configuration of FIG. 14.

Yet another option for connecting the fixed and rotating masses 1010, 1015 is to replace the magnet of FIGS. 12 and 13 with a linear spring. The spring may be generally placed in a cavity formed approximately where the magnets are depicted in FIG. 12. One end of the spring may be connected to each of the fixed and rotating masses. Conceptually, the spring may resist motion of the fixed and floating masses; when the expansionary force exerted by the floating mass during high-frequency rotation is sufficiently great, the spring may stretch to permit the fixed and floating masses to separate. As with other embodiments described herein, the masses may move back to their initial or rest positions when the frequency of rotation slows.

Figure 16:
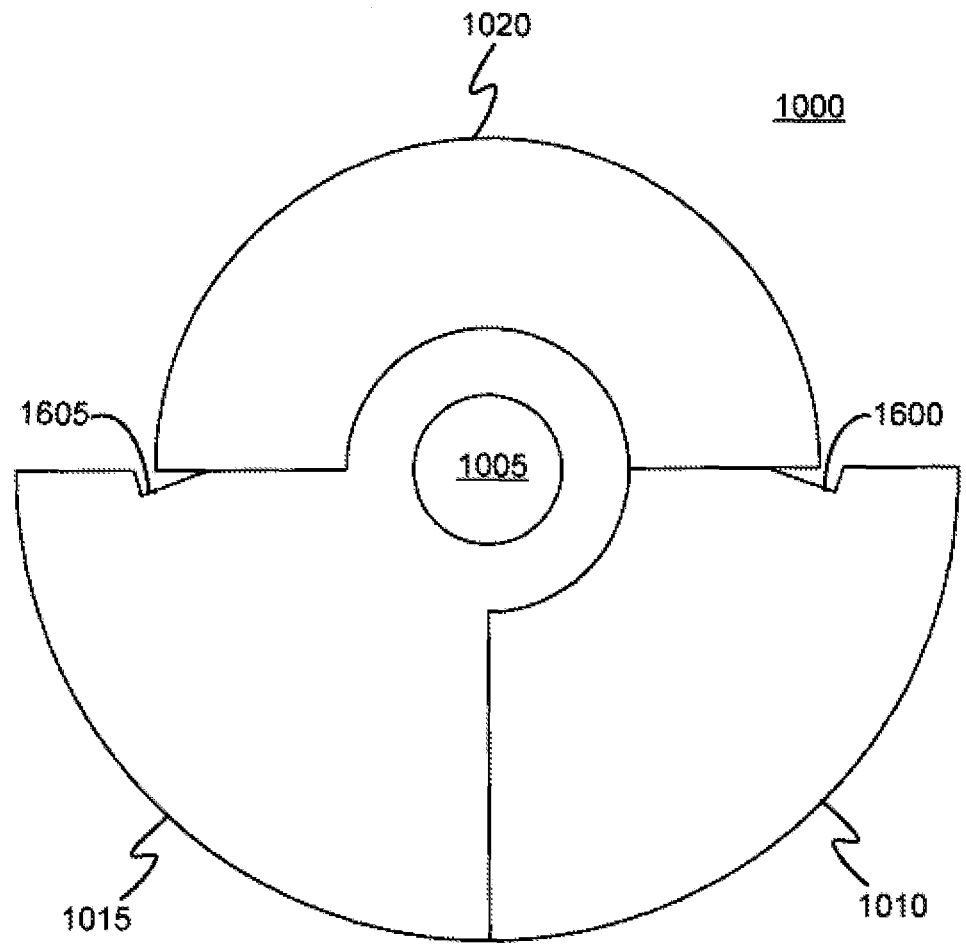
FIG. 16 shows a sample butterfly weight having a pair of notches defined therein to restrict motion of a floating mass of the weight.
Figure 17:
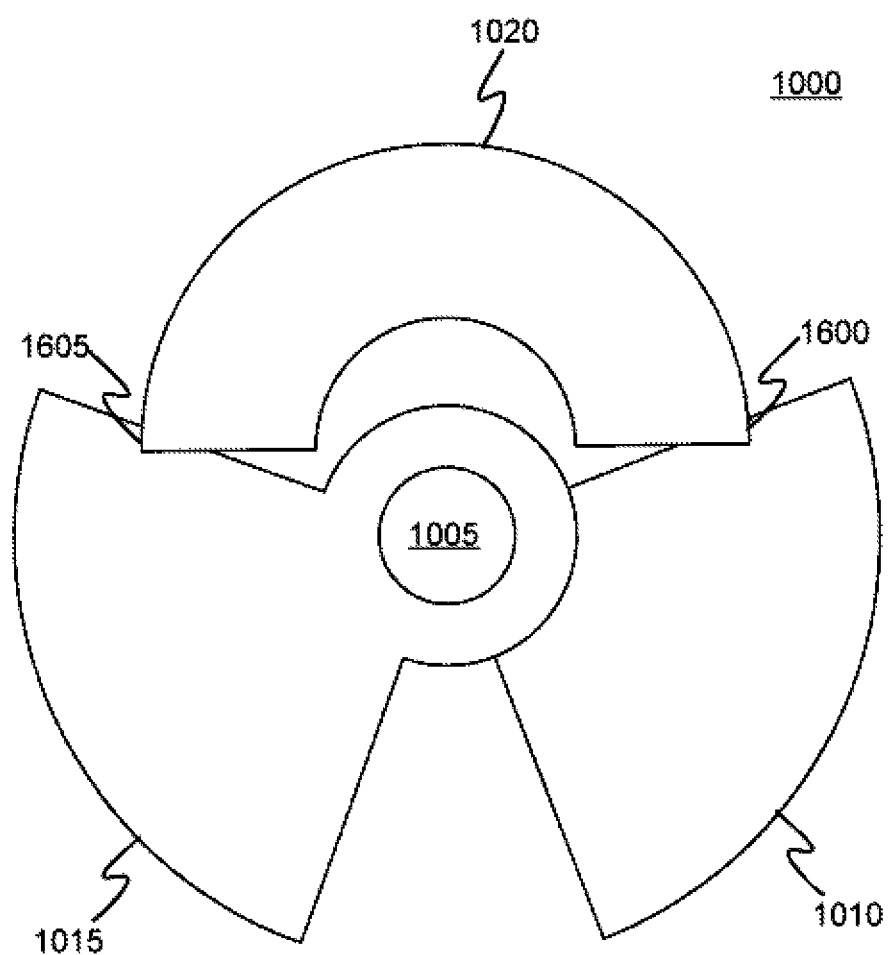
FIG. 17 shows the butterfly weight of FIG. 16 in a balanced configuration.

Some embodiments may provide locating features to restrain motion of the floating mass 1020 during high-frequency rotation. For example, and as shown in FIGS. 16 and 17, a pair of notches 1600, 1605 may be formed in the butterfly weight 1000. More specifically, one notch may be formed in each of the fixed and rotating masses 1010, 1015. As the fixed and rotating masses move away from one another during high-frequency rotation, the edges of the floating mass 1020 may enter the notches 1605, 1610, which may have the effect of arresting motion of the fixed and rotating masses. The notches may be formed at points along the edges of the fixed and rotating masses in order to arrest the masses' motion when the three masses positions that place the center of mass of the butterfly weight 1000 on the axis of rotation. Thus, the notches facilitate balancing the center of mass of the butterfly weight during high-frequency rotation.

Figure 18:
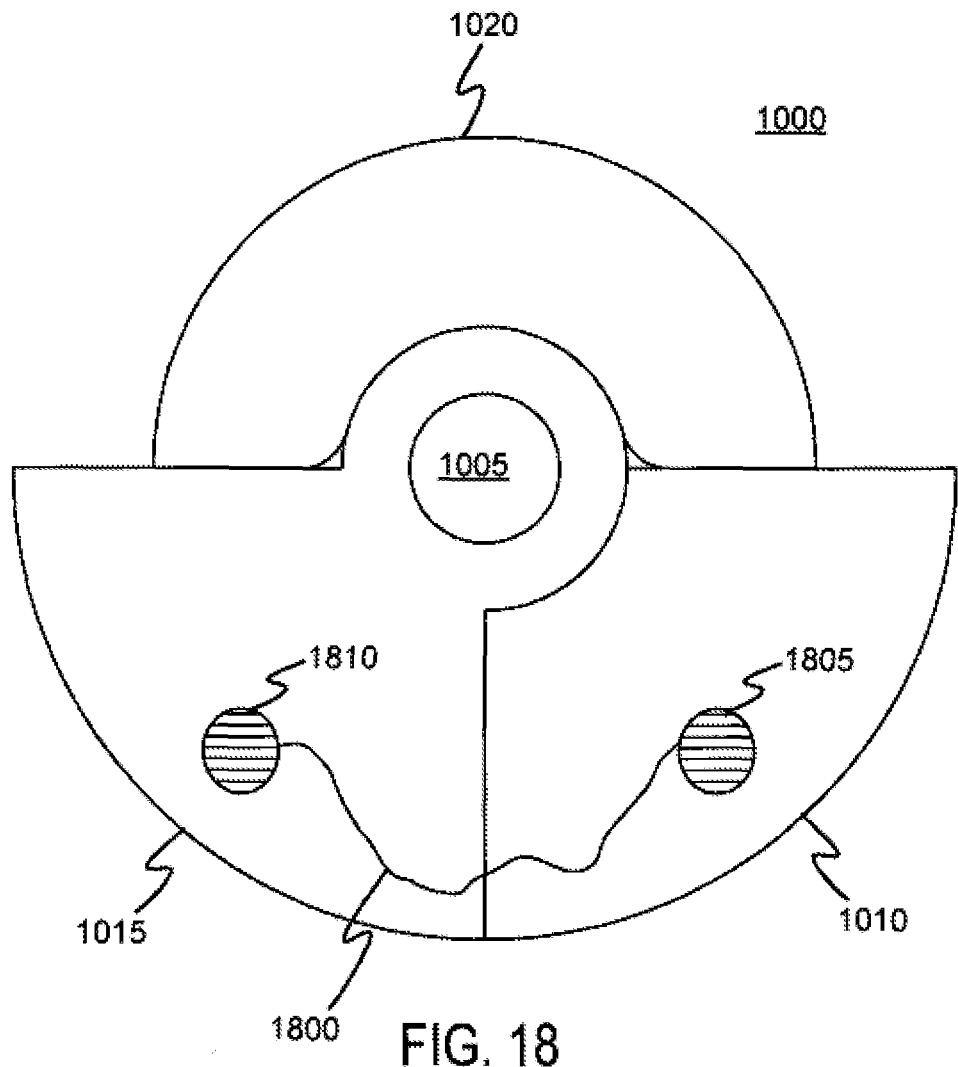
FIG. 18 shows a butterfly weight having a line extending between a fixed and rotating mass, while in an unbalanced configuration.
Figure 19:
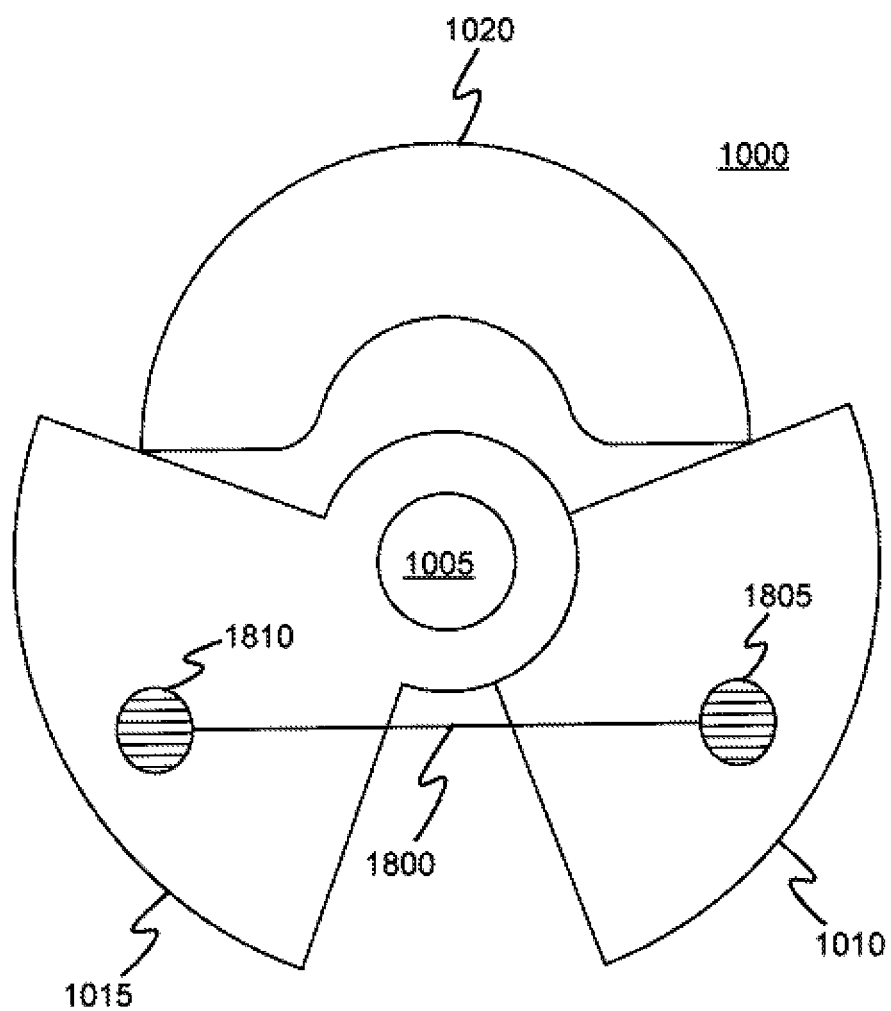
FIG. 19 shows the butterfly weight of FIG. 18 in a balanced configuration, with the line restricting motion of the fixed and rotating masses with respect to one another.

Another example of an anchoring mechanism that may assist in balancing the mass of the butterfly weight 1000 during high-frequency rotation is shown in FIGS. 18 and 19. A line 1800 may connect the fixed and rotating masses 1010, 1015. The ends of the line may be anchored in the fixed and rotating masses by any suitable mechanism 1805, 1810, including screws, rivets, pins and the like. Generally, the line is slack during rest of low-frequency rotation of the butterfly weight 1000. During high-frequency rotation and as previously discussed, the fixed and rotating masses may separate. The separation distance between the two may be controlled by the length of the line 1800. When the line is pulled taut by motion of the fixed and rotating masses, it may check that motion, as shown in FIG. 19. Thus, the line may prevent further motion of the fixed and rotating masses relative to one another while still permitting them to rotate about the shaft. Since the length of the line 1800 controls the separation distance 1900 of the two masses, the line may be configured to halt the separation of the fixed and rotating masses at the point where the overall butterfly weight 1000 is balanced about the axis of rotation.

Figure 20:
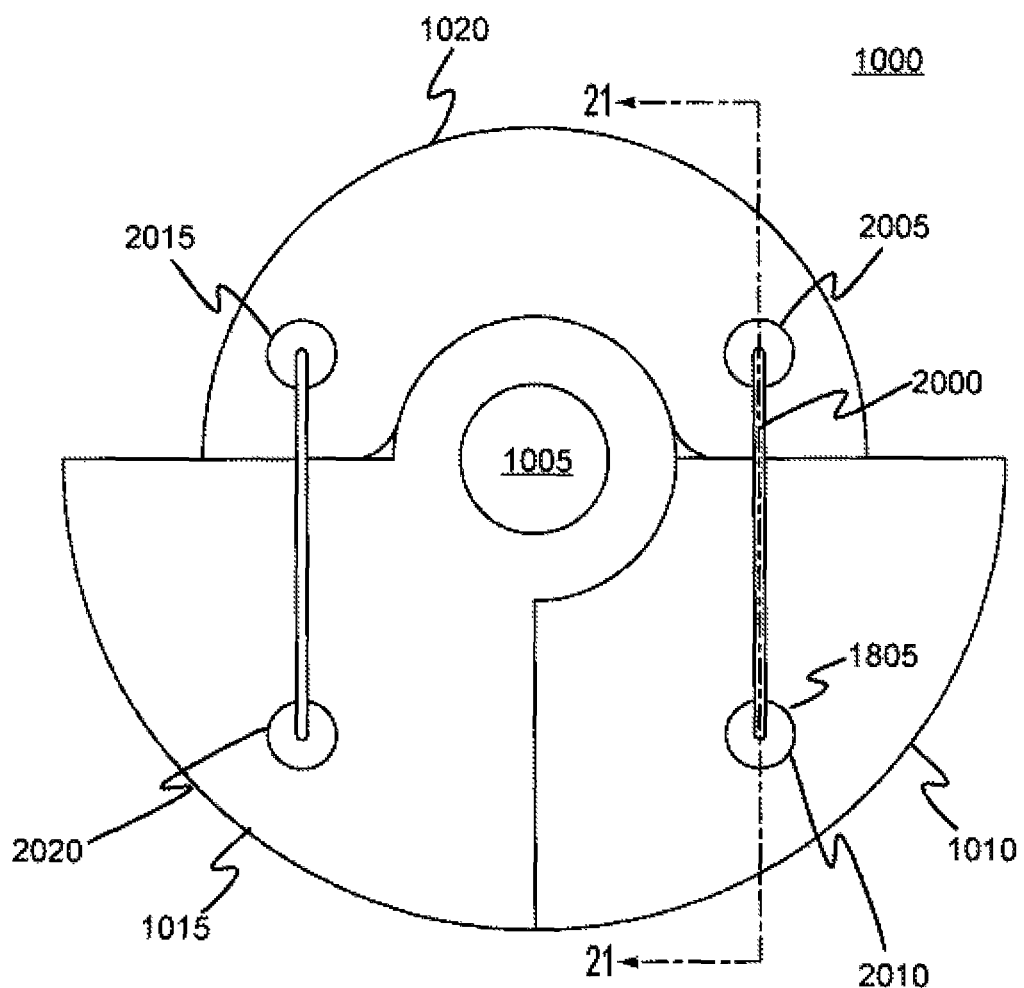
FIG. 20 shows yet another example of a butterfly weight in an unbalanced configuration.
Figure 21:
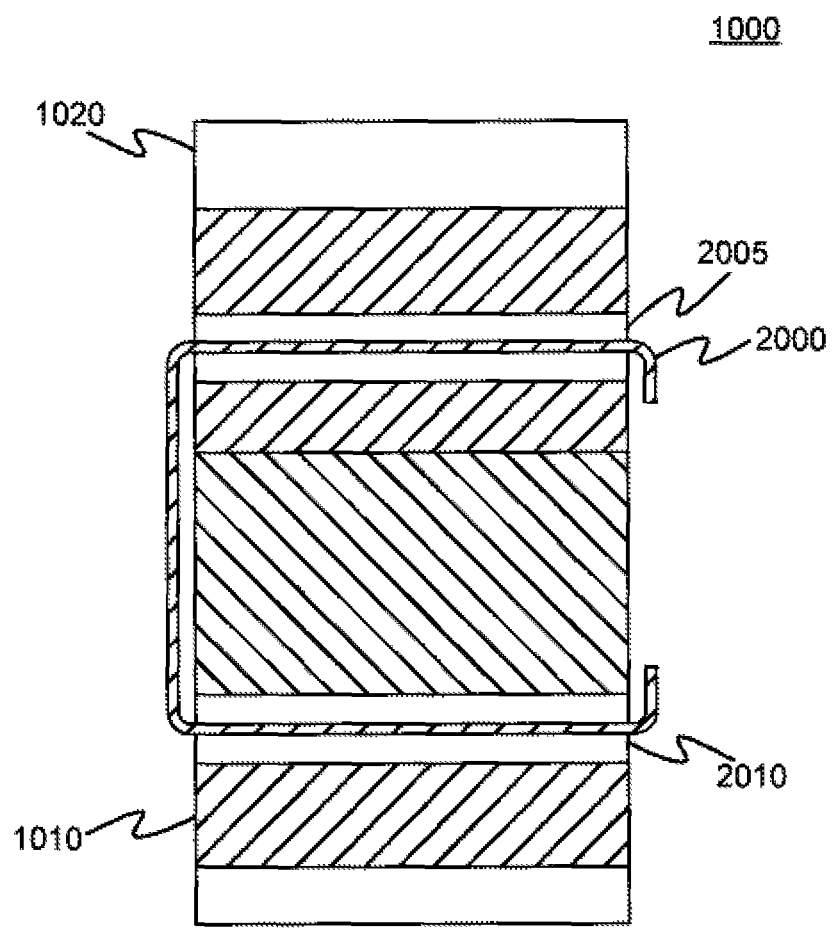
FIG. 21 is a cross-sectional view of the weight shown in FIG. 20, taken alone line 21-21.
Figure 22:
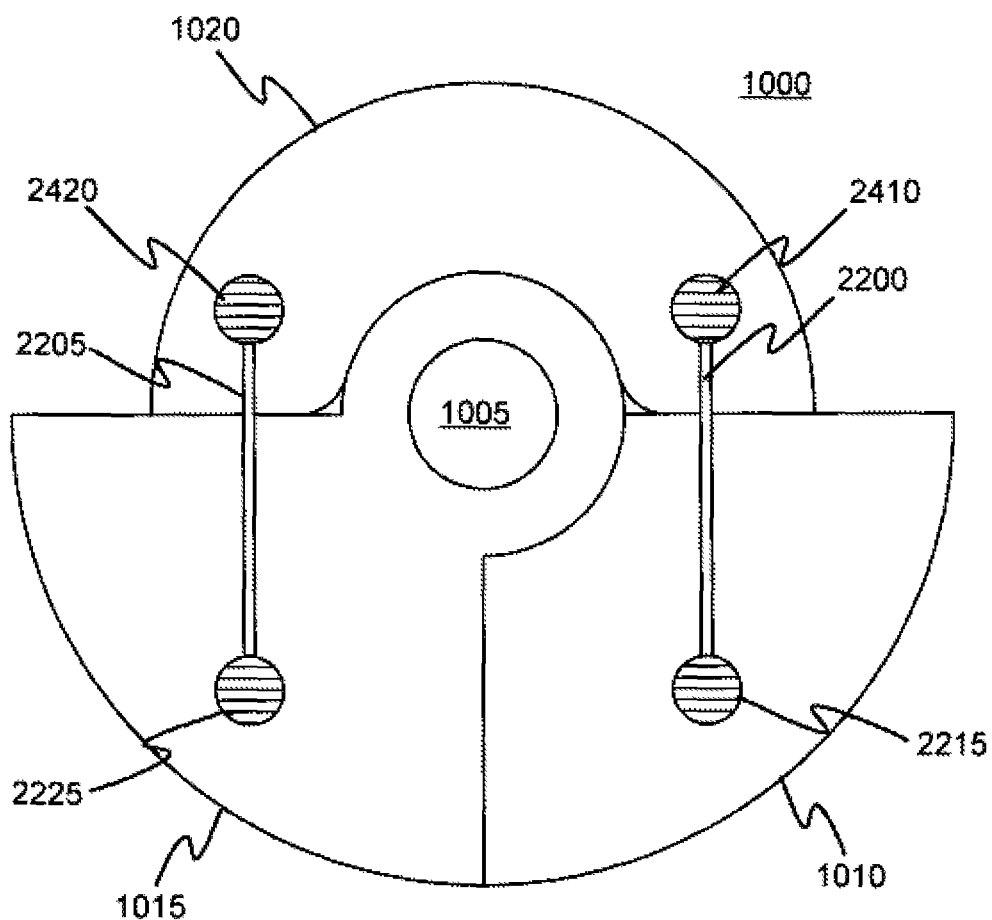
FIG. 22 shows a butterfly mass with lines connecting the floating mass to each of the fixed and rotating masses.

It should be appreciated that a variety of methods and apparatuses may be used to connect the floating mass 1020 to one or both of the fixed and rotating masses 1010, 1015. For example, a wire 2000 (or wires) may pass through a series of holes 2005, 2010, 2015, 2020 defined in each of the three masses to connect them all to each other, as shown in FIG. 20 and the cross-sectional view of FIG. 21. Generally, the cross-section of FIG. 22 is taken through the floating mass 102 and fixed mass 1010. The shaded floating and fixed masses are both curved, and so a portion of each mass extends away from the cross-section (e.g., the unshaded portion of each). It should be appreciated that embodiments may use a single wire 2000 that extends through all four apertures 2005, 2010, 2015, 2020, or two wires, each extending through two apertures, as desired. The latter embodiment is shown.

Alternately, rigid members 2200, 2205 may be used to connect the masses and anchored by anchor elements 2210, 2215, 2220, 2225 (illustrated by shaded circles), as shown in FIG. 22. The anchor elements may be rivets, screws, fasteners, and the like, and may be any shape or size. The anchor elements may extend fully or partially through their respective masses. Likewise, the positioning of the anchor elements may vary between embodiments. Accordingly, the shape and position shown in FIG. 22 is illustrative of one embodiment only.

Other connectors may be used, in addition or in place of those discussed herein. For example, a groove may be formed in each of the fixed and rotating masses and mating tongues or other protrusions may be formed on the floating mass. The grooves may be angled, such that motion of the tongues along the grooves serve to pull the outer edges of the fixed and rotating masses upward, thereby separating the two.

Figure 23:
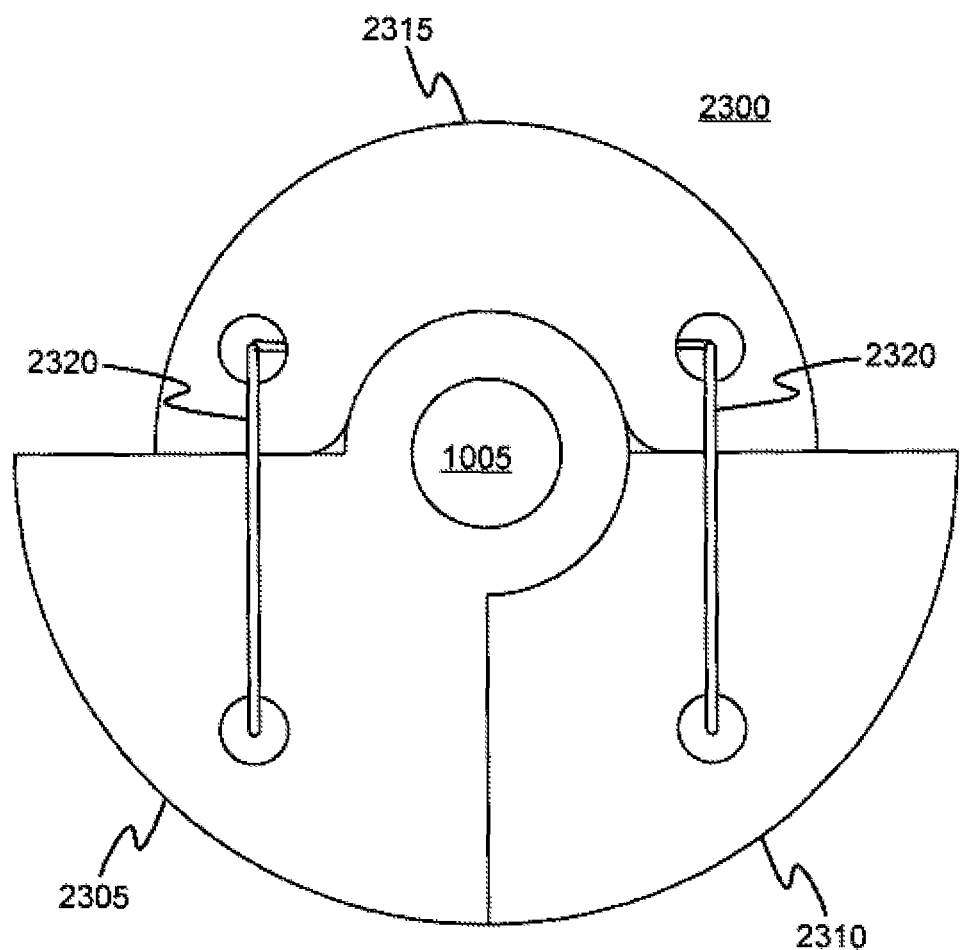
FIG. 23 shows a butterfly mass with its constituent weights connected by lines in an unbalanced configuration.

Yet another embodiment of a butterfly mass 2300 is shown in FIG. 23. Here, the butterfly mass includes an anchored mass 2305, a pushed mass 2310 and a floating mass 2315. A single wire 2320 is illustrated connecting the three masses to one another, but any suitable connection mechanism may be used. The anchored mass 2305 may be affixed to a shaft or other rotational axis, while the pushed mass may be free to move at least partially with respect to the shaft.

Figure 24:
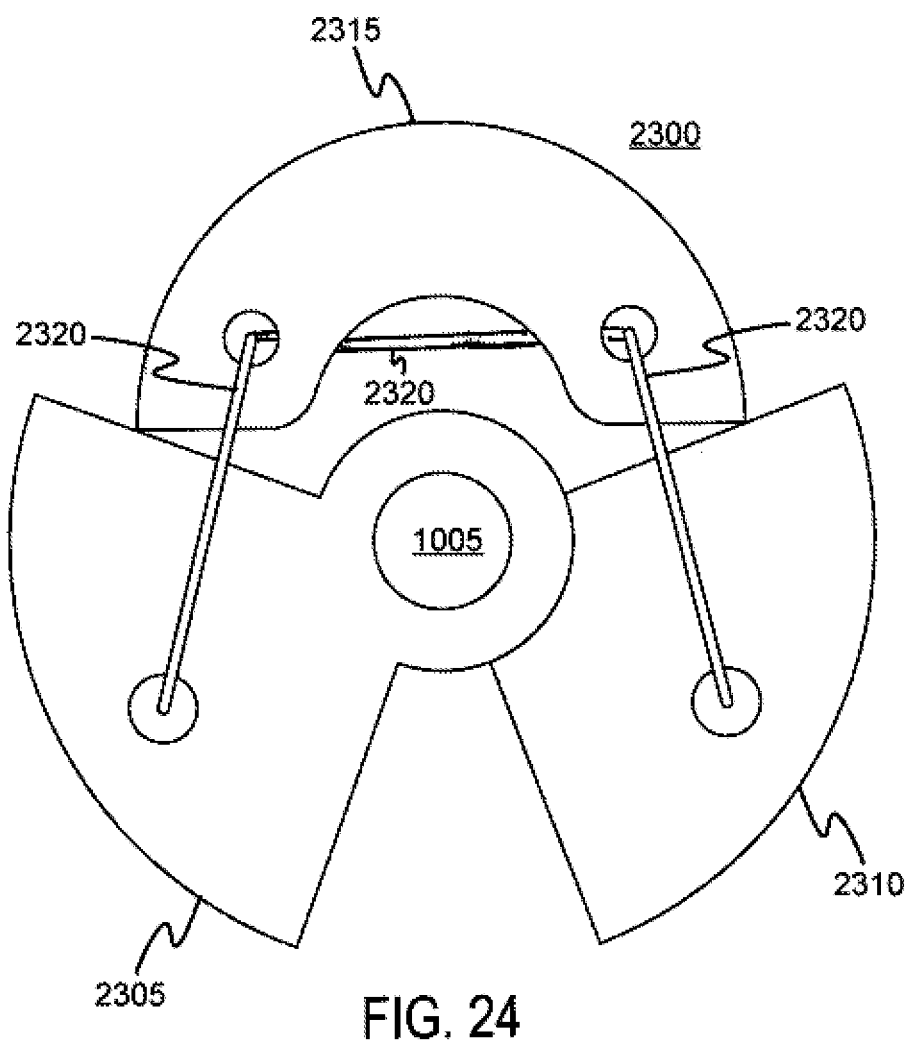
FIG. 24 shows the butterfly mass of FIG. 23 in a balanced configuration.

During operation, the anchored mass 2305 may be driven by motion of the shaft. The anchored mass, in turn, propels the pushed mass 215 and floating mass to rotate about the shaft or other axis of rotation. When a certain rotational frequency is reached, the anchored mass may decelerate or even briefly change its direction of rotation. The inertia of the pushed mass causes it to separate from the anchored mass, as it will continue to rotate. This, in turn, forces the floating mass outward and away from the shaft. The anchored mass may then resume motion in its original rotational direction. Thus, as shown in FIG. 24, the anchored and pushed masses 2305, 2310 may separate while the floating mass 2315 is pushed outward, thereby placing the butterfly weight 2300 into a balanced configuration during high-frequency rotation. The wire 2320 may prevent excessive or undesired separation of the three masses.

In yet another variant and as shown in FIGS. 25-28, the anchored and pushed masses may be replaced with first and second driven masses 2520, 2525 and held together with magnets 2505, 2510 or a similar connection structure. A disc 2515 attached to the drive shaft may push either of the driven masses 2520, 2525 during operation at a low rotational frequency. Further, a centripetal mass 2530 may be affixed to the drive shaft. At low frequency rotational speeds, the overall structure formed by the three masses 2520, 2525, 2530 may have a center of mass that is not aligned with the center of the drive shaft 1005. (The magnets and edges of the disc shown in dashed lines in FIGS. 25-28 generally are not visible when the embodiment 2500 is in the depicted orientations, but are included for illustrative purposes.)

When the rotational frequency exceeds a minimum threshold, the force exerted on one of the driven masses 2520, 2525 by a flange or plate 2800 extending from the disc 2530 may be sufficient to overcome the magnetic attraction of the magnets 2505, 2510. Thus, the driven masses 2520, 2525 may break apart from one another and separate, and the overall structure may assume a balanced configuration with its center of mass aligned with the center of the drive shaft 1005. When the driven masses 2520, 2525 separate, the centripetal mass 2530 may be forced upward to the position shown in FIG. 27, thereby balancing the mass distribution of the embodiment. Essentially, the disc 2530 and flange 2800 may be thought of as a driver for the driven masses, in that the flange pushes on one of the masses as the shaft rotates, thereby moving the mass. It should be appreciated, then, that the driven masses need not be fixedly connected to the shaft as the driver may operate to rotate the masses as the shaft rotates (e.g., may transfer kinetic energy from the shaft to at least one of the driven masses).

Figure 28:
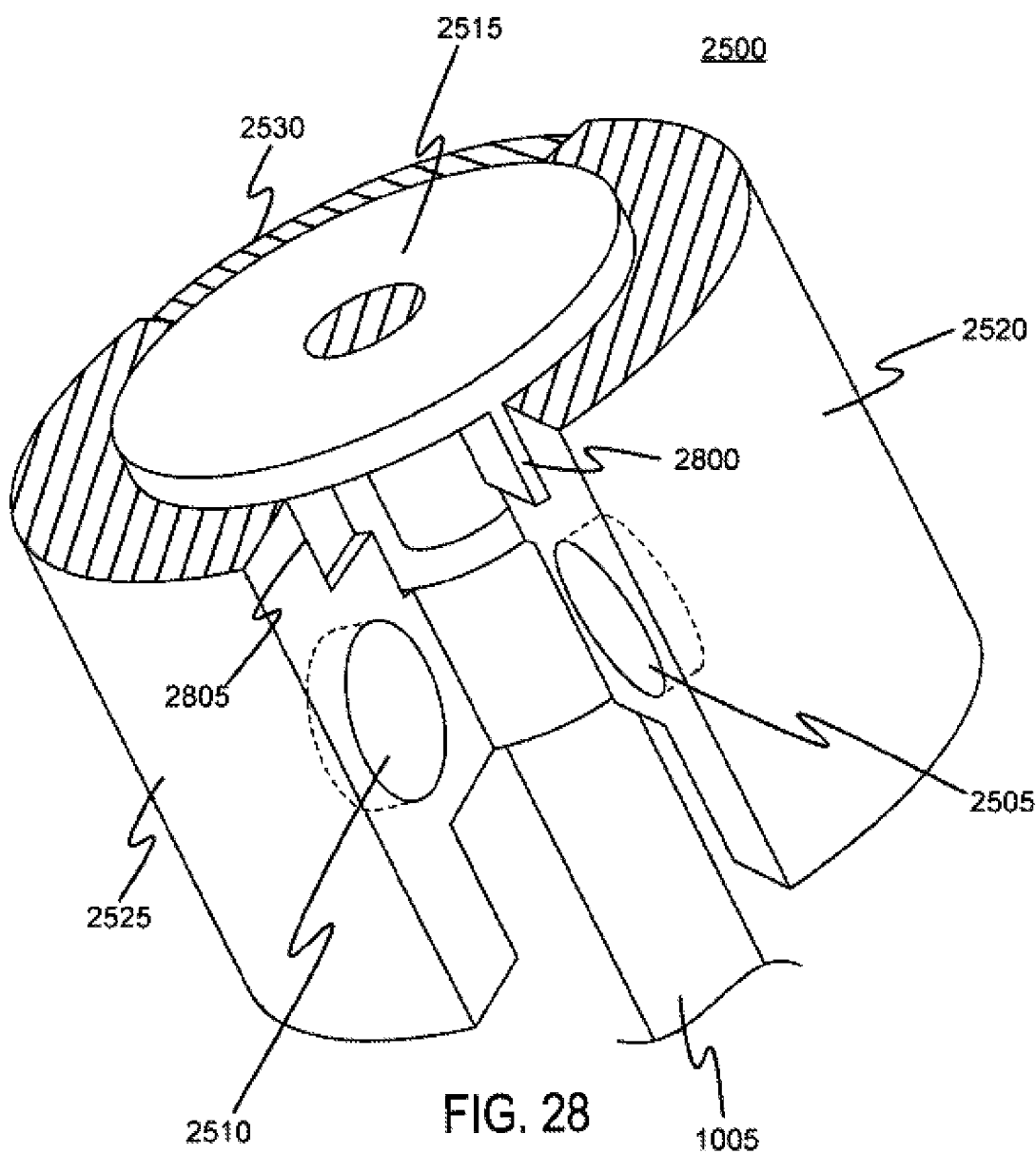
FIG. 28 generally depicts an isometric view of the butterfly mass of FIG. 25, in an open position and more clearly showing the set of magnets, with a cross-section taken through a front face of the butterfly mass to more clearly show a driver plate.

Generally, the flange 2800 will continue to push one driven mass so long as the shaft 1005 rotates. In the embodiment shown in FIG. 28, the rightmost mass 2520 is pushed by the flange 2800. More specifically, the disc 2530 is fixedly coupled to the shaft 1005, so that the disc 2530 rotates as the shaft rotates. In the example of FIG. 28, the shaft may rotate counter-clockwise, thereby pushing the flange 2800 against the inner surface of the driven mass 2520.

Figure 25:
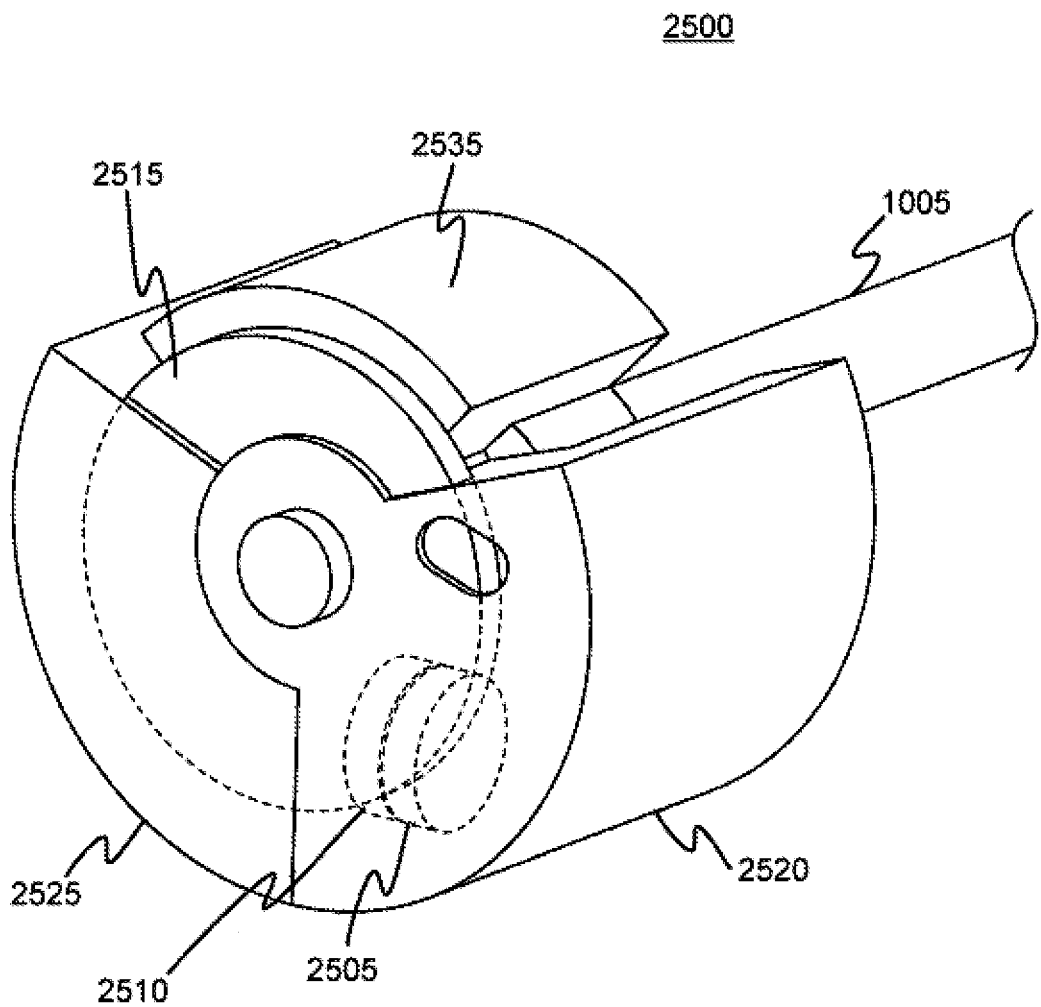
FIG. 25 generally depicts an isometric view of a butterfly mass in a closed position and mounted to a shaft, which a set of magnets mounted in certain weights of the butterfly mass.
Figure 26:
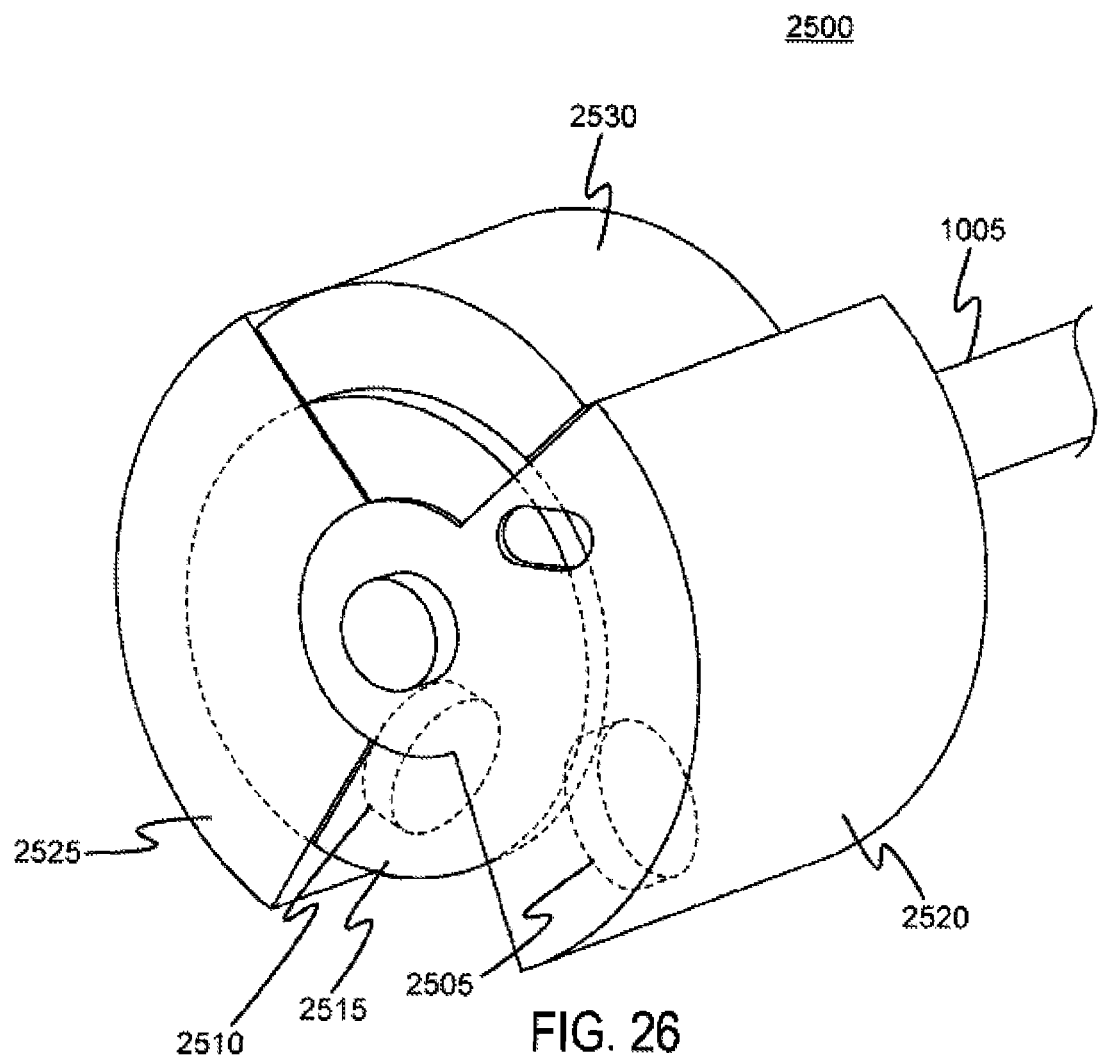
FIG. 26 generally depicts an isometric view of the butterfly mass of FIG. 25, in an open position and mounted to a shaft, which a set of magnets mounted in certain weights of the butterfly mass.
Figure 27:
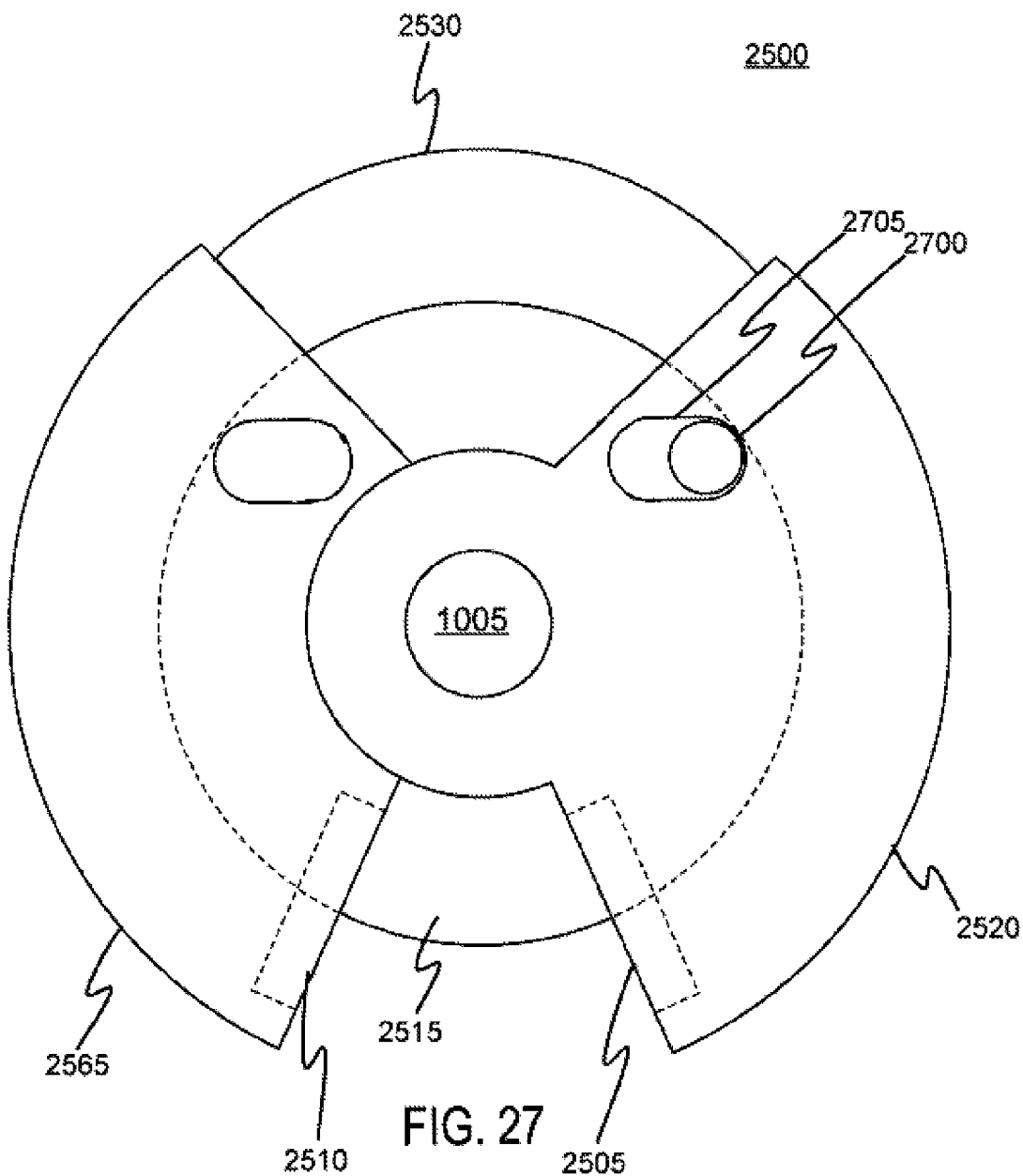
FIG. 27 generally depicts a front view of a butterfly mass of FIG. 25, in an open position and mounted to a shaft, which a set of magnets mounted in certain weights of the butterfly mass.

At some rotational speed, the inertia of the second driven mass 2525 will be such that its resistance to rotation (e.g., its drag force) is greater than the magnetic force of attraction between the two magnets 2505, 2510. When this occurs, the flange 2800 will push the first driven mass 2520 away from the second driven mass 2525. The second driven mass will effectively "drop back" with respect to rotation about the shaft. The centripetal mass 2530, in turn, is pushed upward and away from the shaft as the two driven masses separate. Each driven mass impacts an opposing side of the centripetal mass 2530 and exerts a force thereon. Since the centripetal mass may move at least some distance radially away from the shaft 1005, the forces exerted on the angled ends of the centripetal mass 2530 by the driven masses 2520, 2525 are translated into radial motion. Thus, the centripetal mass may move from a position relatively close to, or abutting, the shaft 1005 (as shown in FIG. 25) to an outward position away from the shaft (as shown in FIGS. 26-28).

In some embodiments, a pin 2700 may extend outwardly from the disc 2515 and through an aperture 2705 formed in one of the driven masses 2520. The combination on pin 2700 and aperture 2705 may permit some motion of the disc and mass with respect to one another while limiting overtravel between the two. It should be appreciated that many embodiments may omit the pin 2700 and aperture 2705, while others may employ such arrangements with respect to both driven masses. The pin is shown only in FIG. 27 for purposes of clarity and example.

As rotation of the embodiment 2500 slows, the inertia of the second driven mass 2525 may bring it closer to the first driven mass 2520. When the driven masses are sufficiently close, the attraction between the two magnets 2505 2510 may cause the driven masses to move closer to one another and recouple. When this occurs, the centripetal mass 2530 may return to its original position adjacent to, or at least nearer, the shaft 1005. Further, when the driven masses couple in this fashion, the flange 2800 may be received in a cavity 2805 formed in a face of one of the driven masses. The driven mass in which the cavity 2805 is formed may vary between embodiments.

It should be appreciated that the embodiment 2500 has been generally discussed with respect to counter-clockwise rotation of the shaft 1005, and thus counter-clockwise motion of the masses 2520, 2525, 2530. In many embodiments, the shaft may instead, or also, rotate clockwise with effects similar to those previously described, except that the driven mass on which the flange 2800 exerts force would be mass 2525.

Figure 29:
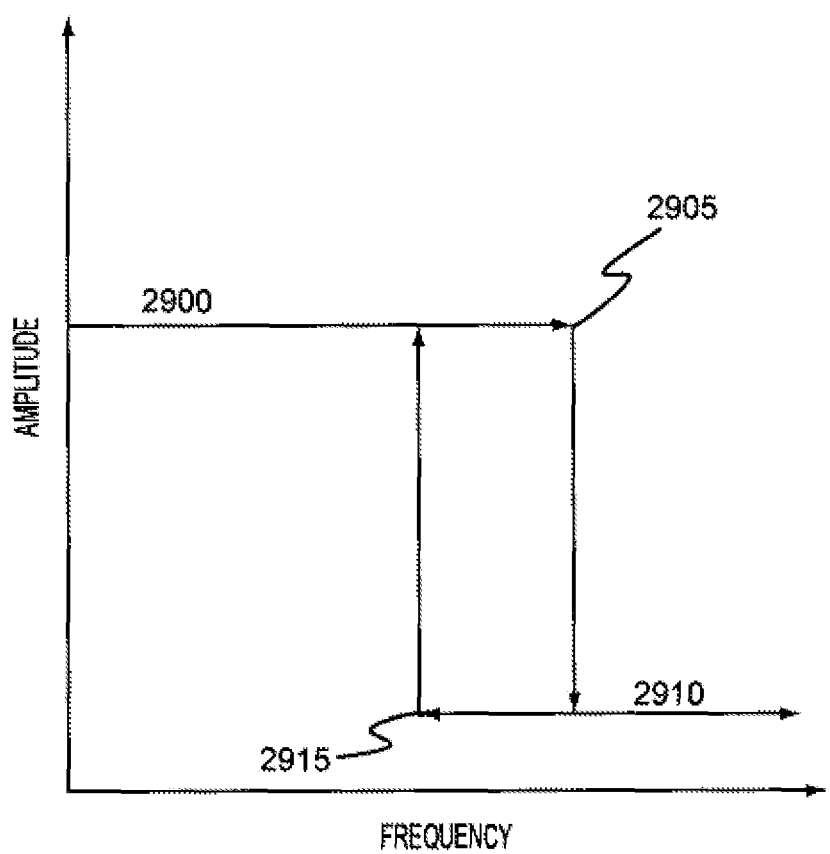
FIG. 29 is a graph of amplitude versus frequency, showing a hysteresis that may be experienced by embodiments described herein.

It should be appreciated that the rotational frequency at which the two driven masses 2520, 2525 separate may not be the same as the rotational frequency t which they rejoin. That is, the butterfly mass 2500 may experience a certain hysteresis that prevents the masses 2520, 2525 from rejoining at the same rotational frequency at which they separate. FIG. 29, for example depicts a graph of the amplitude of a vibration or output of the embodiment 2500 at given frequencies.

As shown, the embodiment 2500 generally starts in an unbalanced condition, such that its amplitude signal 2900 is relatively high. At a first inflection point 2905 corresponding to a particular threshold frequency of rotation, the masses may break apart and the embodiment 2500 may assume a position in which its center of mass is at or near the shaft 1005. Thus, the amplitude of the signal produced by the embodiment 2500 drops to a low, constant level 2910 and remains there as frequency increases.

As the rotational frequency decreases, the embodiment 2500 may remain in its balanced configuration until a second inflection point 2915 corresponding to a second threshold rotational frequency is reached, representing the slowing down of the shaft's, and embodiment's rotation. At this inflection point frequency, the attractive force between the magnets 2510, 2505 may snap the driven masses 2520, 2525 back together, thereby placing the embodiment back in an unbalanced state. Accordingly, the amplitude of the embodiment's output signal returns to a relatively high level 2900. The second inflection point may occur at a lower rotational frequency 2915 than the first inflection point 2905, which represents the hysteresis of the embodiment 2500.

It should be appreciated that the initial amplitude of the signal (e.g., before inflection point 2905) and the resulting amplitude of the signal (e.g., after break point 2905) are shown as constant, but in practice minor variations may occur. Thus, it should be understood that the graph of FIG. 29 is meant for illustration only.

The foregoing describes some example embodiments of coupled masses used to generate vibration and/or alter angular momentum of a falling device. Although the foregoing discussion has presented specific embodiments, persons skilled in the art will recognize that changes may be made in form and detail without departing from the spirit and scope of the embodiments. Additionally, one or more of the embodiments may be combined together to achieve a desired performance. For example, a spring maybe implemented with an embodiment utilizing magnets to help hold and return the second weight to a resting position. Accordingly, the specific embodiments described herein should be understood as examples and not limiting the scope thereof.

The invention claimed is:

1. A system comprising:
a motor;
a shaft attached to the motor;

a first weight fixed with respect to the shaft;
a second weight adjacent the first weight and free to rotate at least partially about the shaft; and
a third weight operationally connected to the first and second weights, wherein:
the third weight is configured to move outwardly from the shaft as a speed of the motor is increased; and
the system is configured to become more balanced as the third weight moves outwardly from the shaft.

2. The system of claim 1, wherein:
the center of mass of the three weights is other than the center of the shaft when the third weight is in a first position; and
the center of mass of the three weights is aligned with the center of the shaft when the third weight is in a second position.

3. The system of claim 1, wherein the third weight is affixed to the first and second weights.

4. The system of claim 3, wherein a centripetal force moves the third weight away from the shaft.

5. The system of claim 4, wherein the movement of the third weight away from the shaft causes the first and second weights to move away from one another.

6. The system of claim 1, further comprising a connection mechanism maintaining the first and second weights adjacent one another prior to when third weight moves outwardly toward the shaft.

7. The system of claim 6, wherein the connection mechanism permits the first and second weights to separate as the third weight moves outwardly toward the shaft.

8. The system of claim 7, wherein the connection mechanism is a set of magnets and at least one of the set of magnets is housed in each of the first and second weights.

9. The system of claim 1, wherein:
the system further comprises an enclosure and a display; and
the first and second weights are configured to produce a haptic output to the enclosure as the shaft is rotated.

10. The system of claim 9, wherein:
the haptic output is produced in response to an alert.

11. An apparatus for generating a haptic output, comprising:
a first mass adjacent a shaft;
a second mass adjacent the shaft and configured to rotate at least partially around the shaft;
a third mass situated between the first and second masses; and
a driver configured to rotate the shaft;
wherein:
the third mass is configured to move away from the shaft as a speed of the rotation increases; and
a combined center of mass of the first and second masses moves toward an axis of rotation of the shaft as the speed of the rotation increases.

12. The apparatus of claim 11, wherein the movement of third mass causes the apparatus to exhibit an unbalanced configuration.

13. The apparatus of claim 11, wherein the driver is configured to separate the first and second masses as the speed of the rotation increases.

14. The apparatus of claim 11, wherein the driver comprises:
a disc affixed to the shaft; and
a projection extending from a surface of the shaft, the projection abutting the first mass.

15. The apparatus of claim 11, further comprising:
a first magnet disposed in the first mass; and
a second magnet disposed in the second mass;
wherein the magnets are configured to hold the first and second masses adjacent one another until a threshold rotational frequency is reached.

16. The apparatus of claim 11, wherein:
the apparatus is disposed within an enclosure; and
the first and second weights are configured to deliver a vibration to the enclosure as the driver is rotated.

17. An electronic device, comprising:
an enclosure;
a display;
a motor;
a shaft attached to the motor;
a first weight fixed with respect to the shaft;
a second weight adjacent the first weight and free to rotate at least partially about the shaft; and
a third weight operationally connected to the first and second weights, wherein:
the third weight is configured to move outwardly from the shaft as a speed of the motor increases such that the first and second weights become more balances as the third weight moves outwardly from the shaft; and
the first and second weights are configured to provide a haptic output for the electronic device.

18. The electronic device of claim 17, wherein the haptic output is provided in response to an event.

19. The electronic device of claim 17, wherein the first and second weights are configured to provide a second haptic output when the speed of the motor decreases.

* * * * *